US010599741B2

(12) United States Patent
Corlett et al.

(10) Patent No.: US 10,599,741 B2
(45) Date of Patent: Mar. 24, 2020

(54) APPLICATION SOFTWARE FOR A BROWSER WITH ENHANCED EFFICIENCY

(71) Applicant: Big Fish Design, LLC, Austin, TX (US)

(72) Inventors: Andrew J. Corlett, Austin, TX (US); Aaron C. Lyman, Austin, TX (US)

(73) Assignee: Big Fish Design, LLC, Austin, TX (US)

( * ) Notice: Subject to any disclaimer, the term of this patent is extended or adjusted under 35 U.S.C. 154(b) by 225 days.

(21) Appl. No.: 14/901,765

(22) PCT Filed: Jul. 2, 2014

(86) PCT No.: PCT/US2014/045234
§ 371 (c)(1),
(2) Date: Dec. 29, 2015

(87) PCT Pub. No.: WO2015/006127
PCT Pub. Date: Jan. 15, 2015

(65) Prior Publication Data
US 2016/0224684 A1 Aug. 4, 2016

Related U.S. Application Data

(60) Provisional application No. 61/843,545, filed on Jul. 8, 2013.

(51) Int. Cl.
*G06F 16/34* (2019.01)
*G06F 16/957* (2019.01)
(Continued)

(52) U.S. Cl.
CPC ...... *G06F 16/9577* (2019.01); *G06F 3/04817* (2013.01); *G06F 3/04842* (2013.01);
(Continued)

(58) Field of Classification Search
CPC .................... G06F 17/30905; G06F 17/30867
See application file for complete search history.

(56) References Cited

U.S. PATENT DOCUMENTS 7,401,294 B2 7/2008 Chang et al.
7,933,896 B2 4/2011 Dexter
(Continued)

OTHER PUBLICATIONS

Printout from Geeklog, Mar. 10, 2002, 1 page.
(Continued)

*Primary Examiner* — Kris E Mackes
(74) *Attorney, Agent, or Firm* — Westman, Champlin & Koehler, P.A.; Theodore M. Magee

(57) ABSTRACT

The disclosed subject matter relates to a computer-implemented method for efficiently viewing documents. The method includes entering and saving keywords and user control parameters corresponding to the keywords, and searching the document for the keyword to find a located keyword. Next, the method changes an area around the located keyword as a function of the saved user control parameters, where the parameters include a warp, a mark and a snip parameter, to provide a changed document. Lastly, the changed document is provided to a rendering engine. In another aspect, the method communicates with a rendering engine ("RE") and comprises entering and saving a keyword and its corresponding user control parameters. Once the presently browsed document is substantially different than a previously searched document, the method formats and provides to the RE a search command as a function of the saved keyword and the saved user control parameters, the search command instructing the RE to modify the presently viewed document in a vicinity of the keyword according to the user control parameters. Next, the method receives a search result from the RE which includes a plurality of occurrences of the keyword and a set of
(Continued)

contextual information related to each occurrence; and finally, parses the search result. The user control parameters comprise a function control parameter, the function control parameter called a one of a mark, snip and a warp. The contextual information returned in the search results includes hyperlinks, images and also character strings. Various types of filters may be used to parse the results according to user preferences and the parsed search results are dynamically presented to the user. This disclosure also provides for computer-readably medium incorporating instructions for the method of the present invention, as well as providing for a computer, smartphone or the like capable of executing this improved browsing method.

21 Claims, 22 Drawing Sheets

(51) Int. Cl.
  *G06F 16/93* (2019.01)
  *G06F 16/9535* (2019.01)
  *G06F 16/954* (2019.01)
  *G06F 3/0481* (2013.01)
  *G06F 3/0484* (2013.01)
  *G06F 17/21* (2006.01)
  *G06F 17/24* (2006.01)

(52) U.S. Cl.
  CPC ............ *G06F 16/345* (2019.01); *G06F 16/93* (2019.01); *G06F 16/954* (2019.01); *G06F 16/9535* (2019.01); *G06F 17/212* (2013.01); *G06F 17/24* (2013.01)

(56) References Cited

U.S. PATENT DOCUMENTS

| | | |
|---|---|---|
| 8,370,342 B1 | 2/2013 | Li et al. |
| 8,627,197 B2 | 1/2014 | Woolf et al. |
| 9,841,863 B1 * | 12/2017 | Totale .................... G06F 3/048 |
| 2006/0200464 A1 * | 9/2006 | Gideoni ................ G06F 16/338 |
| 2009/0222490 A1 * | 9/2009 | Kemp ............... G06F 17/30011 |
| 2010/0211562 A1 | 8/2010 | Busch et al. |

OTHER PUBLICATIONS

Printout from Skiyesounds.com, Jun. 30, 2010, 5 pages.
Printout from Tanners Website, "Herp Derp YouTube Comments", Jun. 3, 2012, 3 pages.
Printout from More jQuery Magic—Search Highlighting, May 2013, 3 pages.
Printout from BBC, "Teen girl blocks Twitter plot spoilers to win hackathon", May 9, 2013, 2 pages.
Printout from Squint, Apr. 9, 2013, 5 pages.
Printout from Interactive, "Side Project: Euro 2012 Score Censor", 2012, 2 pages.
Printout from the New York Times, "Making Facebook Less Infantile", Aug. 8, 2012, 3 pages.
Notification of Transmittal of the International Search Report and the Written Opinion of the International Searching Authority from PCT/US2014/045234, dated Oct. 27, 2014.

* cited by examiner

Fig. 7A

APPLICATION SOFTWARE FOR A BROWSER WITH ENHANCED EFFICIENCY

CROSS-REFERENCE TO RELATED APPLICATION

This Application is a Section 371 National Stage Application of International Application No. PCT/US2014/045234, filed 2 Jul. 2014 and published as WO 2015/006127 on Jan. 15, 2015, in English, which claims priority to U.S. Provisional Application No. 61/843,545, filed Jul. 8, 2013, the contents of which are hereby incorporated by reference in their entirety.

BACKGROUND

The subject technology generally relates to browsers and extensions for browsers for use on mobile devices, and tablet and desktop computers and the like, for enhancing efficiency of the browser and/or the browser extension.

Browsers are readily adapted to review news and updates from sources around the globe, in a variety of formats such as RSS, Web pages in HTML and PDFs. Chrome, Safari, Explorer, Firefox and Epiphany are examples of popular browsers usable on a number of tablet style computers and mobile devices. Most browsers allow users to personalize their viewing experience with user-customizable viewing features, but even so, users are sometimes deluged with incoming data or faced with reviewing only a portion of what they desire to peruse. In some instances, the user may find an advantage in censoring or blocking certain information until a time of their choosing, such as found in a number of "spoiler" apps tied to various browsers.

Some PDF viewers are also available, but they do not interface with the web. One such PDF viewer has erase, mark and change features in it, but it does not work with live documents from the web (e.g., websites of news media such as NY Times, Guardian or ESPN, or RSS feeds from social network websites such as Facebook). As far as features in browsers usable with live web documents, they are limited to single search strings for a searching function.

Rather than spending excessive amounts of time absorbing desired live web information, partially reviewing the desired information, or spoiling the user's interest in a future event, it is desirable to enhance browser efficiency through an enhanced application. What is needed is a higher efficiency browser application or browser, usable on a mobile or tablet device or on a stationary computer, which operates on live Web documents, allows searches of multiple strings on those live web documents so as to provide a method for efficient browsing of the topics of interest to the user.

SUMMARY

The disclosed subject matter relates to a computer-implemented method for efficiently viewing documents. The method includes entering and saving keywords and user control parameters corresponding to the keywords, and searching the document for the keyword to find a located keyword. Next, the method changes an area around the located keyword as a function of the saved user control parameters, where the parameters include a warp, a mark and a snip parameter, to provide a changed document. Lastly, the changed document is provided to a rendering engine.

The disclosed subject matter further relates to a computer-readable medium. The computer-readable medium includes instructions that, when executed by a computer, cause the computer to implement a method for efficiently viewing documents. The instructions include code for entering and saving keywords and user control parameters corresponding to the keywords, and code for searching at least one of the documents to find a located keyword. The instructions further accomplish changing an area around the located keyword as a function of the user control parameters, the parameters representative of a warp, a mark and a snip parameter. Finally the instructions include code for providing the changed document to a rendering engine.

The disclosed subject matter further relates to a system. The system includes one or more processors. The system also includes a memory that includes instructions which, when executed by the one or more processors, cause the one or more processors to implement a method for efficiently viewing documents. The instructions include code for entering and saving keywords and user control parameters corresponding to the keywords, and code for searching at least one of the documents to find a located keyword. The instructions further accomplish changing an area around the located keyword as a function of the user control parameters, the parameters representative of a warp, a mark and a snip parameter. Finally the instructions include code for providing the changed document to a rendering engine.

In another aspect of the present invention for browsing continually updated web documents, the method communicates with a rendering engine ("RE") and comprises entering and saving a keyword and its corresponding user control parameters. Next, the method waits until the presently browsed document is substantially different than a previously searched document, and then formats and provides to the RE a search command as a function of the saved keyword and the saved user control parameters, the search command instructing the RE to modify the presently viewed document in a vicinity of the keyword according to the user control parameters. Next, the method receives a search result from the RE which includes a plurality of occurrences of the keyword and a set of contextual information related to each occurrence; and finally, parses the search result. The user control parameters of the present invention comprise a function control parameter, the function control parameter called a one of a mark, snip and a warp. The contextual information returned in the search results includes hyperlinks, images and also character strings. Various types of filters may be used to parse the results according to user preferences. The parsed search results are dynamically presented to the user.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The FIGURES include these aspects of the present invention:

FIGS. 7A-F show examples of screenshots, illustrating other aspects of the enhanced searching efficiency of browser app 100.

DETAILED DESCRIPTION OF ILLUSTRATIVE EMBODIMENTS

Figure 1:
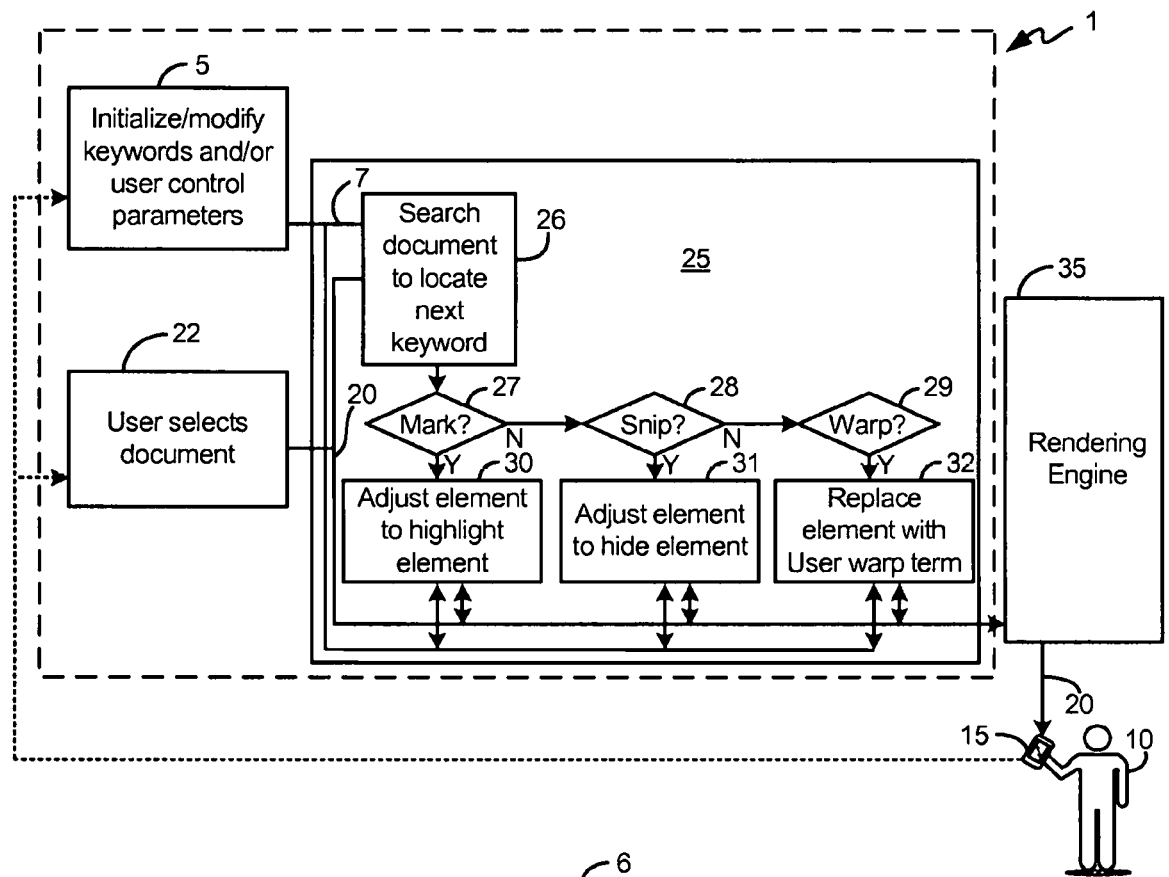
FIG. 1 illustrates the method of the present invention and a memory for saving keywords and their corresponding user control parameters.

FIG. 1 shows the process of the present invention generally at 1. The process operates on a tablet computer (e.g., iPad, GalaxyTab) or a mobile device (e.g., iPhone, Droid), with a corresponding operating system. For example, the process may operate on an Apple IPhone 5 with an Ios operating system or a Samsung GalaxyNote with an AnDroid operating system. A user Joe at 10 views a stream of documents 20 on his tablet computer 15 during a browsing session. Bus 20 conveys a document, which may be in various formats, but preferably the document is in the form of web pages (URLs), RSS feeds or PDF files (the PDFs received over Joe's internet connection or by viewing locally stored PDFs resident on computer 15). During a first browsing session, Joe initializes keywords and user control parameters for his session in a memory 6, accomplished in block 5. At any time during this initial browsing session or thereafter, user 10 selects a document in block 22, the contents of which document is represented on bus 20.

Keyword as used in this document means a word or phrase identifying the object of a user's interest during the instant or subsequent browsing of documents 20. Keywords and their corresponding user control parameters called warp, snip and mark are stored in a memory 6. It is understood that the number of keywords and their corresponding user control parameters is limited only by the size of physical memory 6. Furthermore, the organization of memory 6 in this document presents a logical way for explaining the method of the present invention, but other organizational structures for the information is within the scope of the present invention. Similarly, the order in which each keyword and/or user control parameter is introduced in this document does not limit the scope of the invention.

User control parameters control key aspects of the way documents are presented to user 10. Functional user control parameters are warp, snip and mark, but other similar functions which enhance browsing efficiency are within the scope of the present invention. The warp function uses five sets of information from the user; a keyword and four user control parameters: a function user control parameter (warp), a color user control parameter (the color used to highlight the area where a warp occurred), a replacement word or phrase (which replaces the warped keyword) and a proximity measure user control parameter (word, sentence or paragraph, indicating the area proximate to the keyword). Once a keyword and corresponding warp user control parameters are entered and the process of the present invention is activated, subsequent browsing warps (replaces) selected keywords with corresponding replacement words or phrases, until the user stops browsing documents or until he changes the user control parameters controlling that particular warp function.

The snip function uses four sets of information from the user; a keyword and three user control parameters: a function user control parameter (snip), a proximity user control parameter (word, sentence or paragraph, indicating the extent of the highlighting proximate to the keyword), and a color user control parameter (the color used to highlight the area proximate to the keyword). Snip effectively removes the keyword so that user 10 does not see the snipped word, or information proximate thereto. User 10 controls whether he will know whether the snip occurred through selecting appropriate proximity user control parameters and appropriate color user control parameters.

The mark function uses five sets of information from the user: a keyword and four user control parameters: a function user control parameter (mark), a proximity user control parameter (word, sentence or paragraph, indicating the extent of the highlighting proximate to the keyword), a color user control parameter (the color used to highlight within the designated proximity) and a style user control parameter (indicating style of the font used in the highlighted area). As with the other function user control parameters, mark is sticky within browser use until changed through entering new keywords or corresponding user control parameters. This mark function user control parameter is one of the most apparent and appealing aspects of the present invention, as once block 5 parameters are initialized and stored in memory 6, subsequent documents 20 are highlighted according to the user's selected user control parameters to efficiently allow him to identify topics of interest. Rather than reading an entire page of news feed information from a news source or missing key information because he was not sufficiently attentive, for example, the present invention allows him to efficiently center his attention to the marked areas of his web document.

In another aspect of the present invention, groups of keywords are thematically connected to each other by a color, icon or style of user 10's preference. This thematic grouping (hereinafter called a "collection") allows for efficient identification of similar topics by color.

In another aspect of the invention, one of the function user control parameters, preferably the mark user control parameter, is associated with an audible alarm. The audible alarm provides the user with reinforced knowledge that at least one keyword (or multiple occurrences of the same keyword) are present in the document.

In subsequent browsing sessions, the browser using the method of the present invention retains the keywords and user control parameters which user 10 previously entered. These controls are "sticky", in that they remain in force until they are either altered or deleted.

In memory 6, a user interested in sports has entered keywords "NBA", "NCAA", "Yankees", "Lebron James" as their keywords and desires to mark their occurrences. User 10 wishes to mark each instance of "NBA" in blue and the "B" on the same line means he wishes to bolden that keyword. On the next line in memory 6, user 10 wishes to highlight each occurrence of the keyword "NCAA" in blue, and as the proximity measure user control parameter is "paragraph", the entire paragraph which includes "NCAA" will be highlighted in blue. Additionally, as the style user control parameter is entered as "B", that paragraph will be boldened. On the third line of memory 6, the keyword "Yankees" is entered, and user 10 wishes to bolden ("B") the sentence containing the keyword in blue. On the fourth line of memory 6, the keyword "Lebron James" is entered, and user 10 wishes to highlight and underline the sentence in which "Lebron James" occurs. In memory 6, user 10 selected blue for the highlighting color to thematically group together his keywords representative of his interest in sports. The thematic grouping of similar keywords together by color, style or icon is another aspect of the present invention, in that it allows user 10 to not only efficiently identify his topics of interest, but to allow him to direct his attention to groups of themed collections of keywords.

Similarly, user 10 entered three keywords representative of his interest in financial things, "Sigmatel", "Dow Jones" and "Hang Sen". For the proximate measure user control parameter, user 10 entered "paragraph", "sentence" and "sentence" respectively. User 10 wishes to view these financially related keywords in green, according to the proximate measure user control parameter. In the instance of the "Hang Sen" keyword, any sentence or headline including the keyword will be highlighted in green. Furthermore, the style user control parameter for these financially related keywords is "U", indicating that they will be underlined. It is understood that the present method is not limited by these style choices discussed herein, and can readily include other style choices such as font or other means for focusing attention on a section of text or graphics, such as alternating colors or blinking display intensities.

In memory 6, user 10 wishes to snip all instances of the keyword "Bulls", and wishes to remove the entire paragraph in which "Bulls" is encountered, and further wants to have the empty space colored in pink, so that he is aware that something has been removed from whatever document 20 he views. In this instance, user 10 may know that the Bulls, his favorite basketball team, play later today, but plans on enjoying the game tomorrow. In the meantime, he doesn't wish to know the results of the played game and therefore changes the snip user control parameter of his browser to remove all instances of his favorite team's name, as it appears in a paragraph in a browsed document but wishes to be reminded of his selection by making the deletion appear in pink.

On the next line in memory 6, the phrase "School Tax" is entered as a keyword for a warp function control parameter, and a measure of the proximity around the keyword is also entered to control the highlighting around the warped keyword. In this example, the keyword "School Tax" is unhighlighted so that the user will not be aware that their viewed web document has been altered. Alternatively, if a color were entered in the color user control parameter field, instead of "unhighlighted", the replaced word or phrase would be highlighted by that color. The replacement user control parameter for this keyword is "I support education", so that each occurrence of the phrase "school tax" is replaced unhighlightedly by "I support education". A different user may wish to enter keywords reflecting an interest in types of cars; methods of processing foods; restaurant names; scientific words related to genetic engineered fuels and the companies which promote the same; or verbs which might signify a user's interest in natural disasters.

Block 22 in FIG. 1 shows user 10's selection of a document, preferably in the form of web pages (URLs), RSS feeds or PDF files (the PDFs received over user Joe's internet connection or by viewing locally stored PDFs resident on computer 15. Although only one document is present on bus 20 at one time, as the user browses, bus 20 will convey a plurality of documents during any browsing session.

Figure 2:
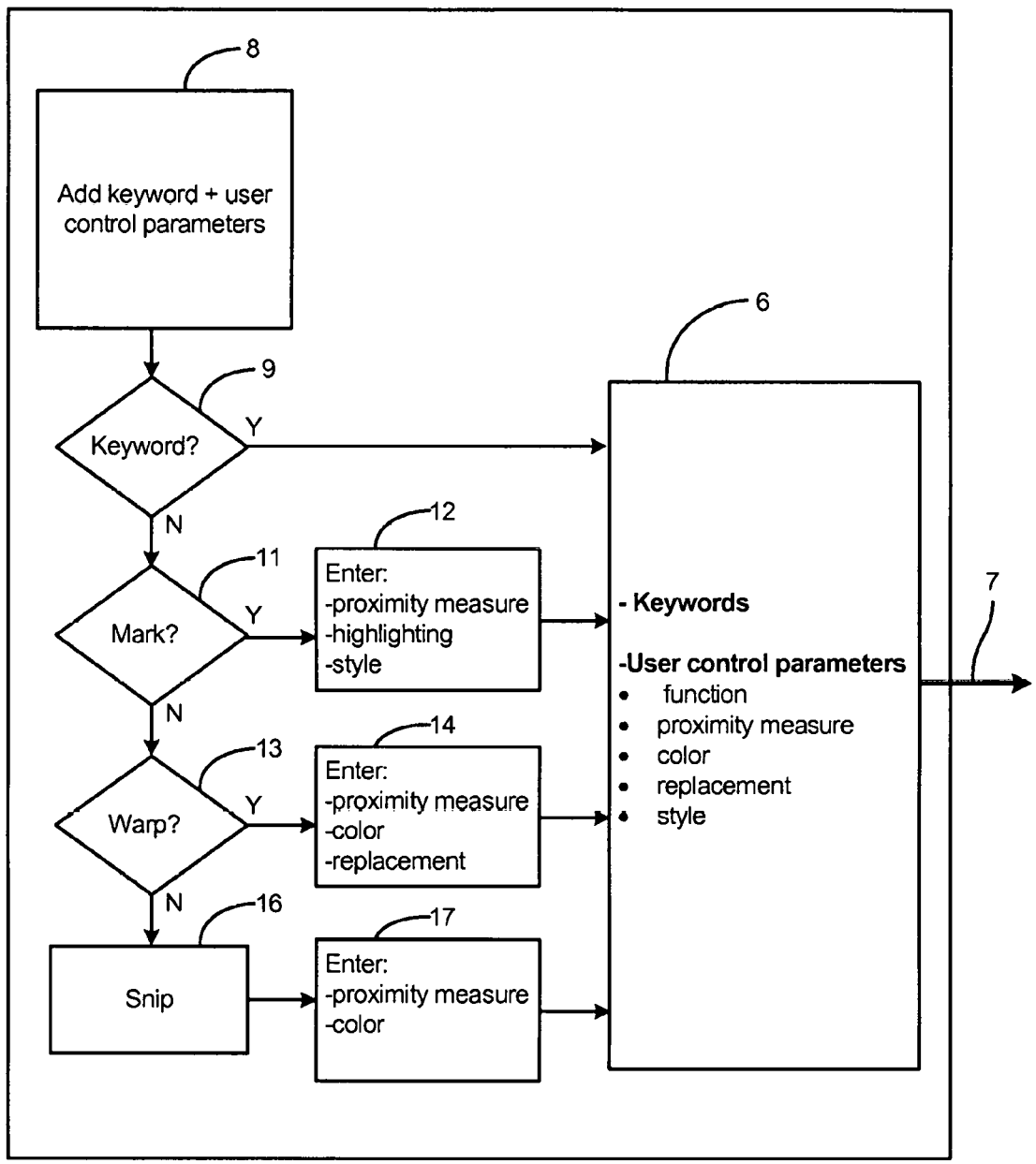
FIG. 2 expands on the keyword and user control parameter block of FIG. 1.

Block 25 contains location and sequencing code in block 26 for locating a first occurrence of a first keyword on the document present on bus 20, (functionality of block 26 presented in more detail in FIG. 2). Once found, the located keyword passes control through decision block 27 for a mark function, decision block 28 for a snip function and decision block 29 for a warp function, to appropriate code which changes the keyword and an area around the keyword according to the user control parameters for that keyword. For example, if the function user control parameter is a mark, code in block 30 adjusts the found keyword and the appropriate area around the keyword, depending on the proximity measure user control parameter and also provides for highlighting and styling of the area of the keyword and the appropriate space around it (the user control parameters available to block 30, and also block 31 and 32, through a connection to bus 7 containing user control parameters). Similarly, for a snip function control parameter, code in block 31 adjusts the found keyword and the appropriate area around the keyword depending on the proximity measure user control parameter and also provides for highlighting and styling of the area of the keyword and the appropriate space around it based on other user control parameters. Finally, if a warp function user control parameter is encountered, code in block 32 adjusts the found keyword and the appropriate area around the keyword depending on the proximity measure user control parameter and also provides for highlighting of the area of the keyword and the appropriate space around it. The same process is repeated for all occurrences of the first keyword, then for the second keyword and so on, until all occurrences of all the keywords have been appropriately changed. Each time the code in blocks 30, 31 or 32 modifies the document, these modifications of the document are made available to bus 20, which is connected to a rendering engine 35. For example, if there were 3 keywords on a page with 5 occurrences of each keyword on that page, software in block 25 would modify bus 20 fifteen times in order to fully process that document, effectively rendering the document to user 10 in fifteen different versions of the document within milliseconds, so that the user is essentially unaware of the sequentially revised document appearing on their tablet computer 15. As there is no saved version of the document provided for in the software of the present invention, if user 10 wishes to reverse, for example, the highlighting of a keyword, the same process as detailed above is essentially completed by block 25 in reverse to remove highlighting in a selected area around the keyword.

Rendering engine 35 is connected to bus 20 which includes information representative of the document which user 10 reviews on tablet computer 15. Engine 35 is part of Apple's UIWebView software, made available by Apple for software intended for iOS environments. The software within block 1, on the other hand, is code written in JavaScript by the inventors, according to the preferred embodiments of the present invention. The method of the present invention can be ported to other operating environments as desired. Furthermore, there are iOS specific signals and information user within this preferred embodiment, one such signal coming from UIWebView to notify block 1 that user 10 selected a new document. This signal and others which are specific to the operating environment are not discussed specifically herein; the function and logical flow of the invention can be ported to other platforms by workers skilled in the art.

FIG. 2 details functionality about the user interface of the present invention with respect to entering keywords and their corresponding user control parameters. A keyword is added in block 8 and stored in memory 6 via decision block 9. Once a mark function control parameter is encountered at block 11, block 12 shows the pertinent parameters (proximity measure user control parameter, highlighting color and style user control parameters) for which user 10 is prompted, all stored in memory 6. Once a warp function control parameter is encountered at block 13, block 14 shows the pertinent parameters (proximity measure user control parameter, highlighting color and replacement term) for which user 10 is prompted, all stored in memory 6. Once a snip function user control parameter is encountered at block 16, block 17 shows the pertinent parameters (proximity measure and color) for which user 10 is prompted, all stored in memory 6. After storing, this keyword information and user control parameters are available to code within block 25 on a bus 7 containing this information. The description of this user interface is intended to be exemplary and not to limit the scope of the present invention. Additionally, other user control parameters other than these preferred embodiments may be user, including, for example, audible alarms when a specific keyword is encountered on a document. Accordingly, several methods for selection of these keywords and user control parameters may be used, and include drop-down menus, links, speech recognition, gesture recognition and point-and-clock technologies.

Figure 3:
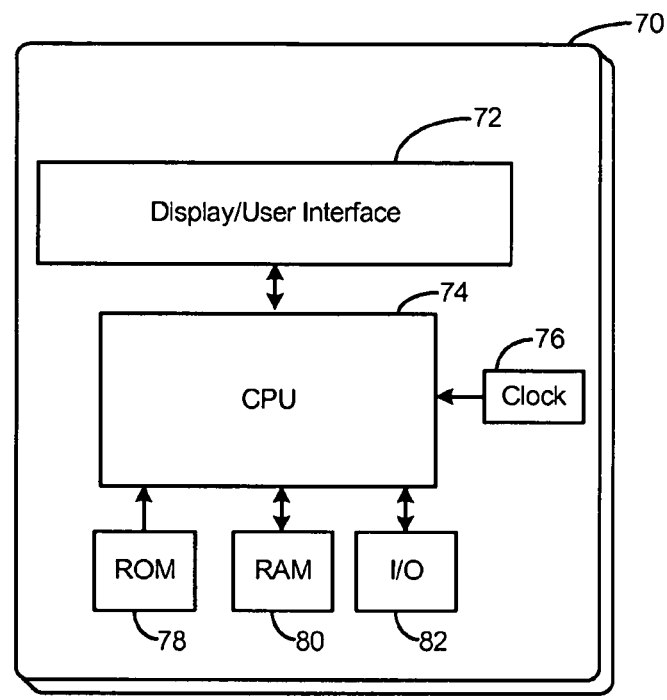
FIG. 3 is a block diagrams of a tablet computer and an Apple smart phone running an embodiment of the method of the present invention.
Figure 3:
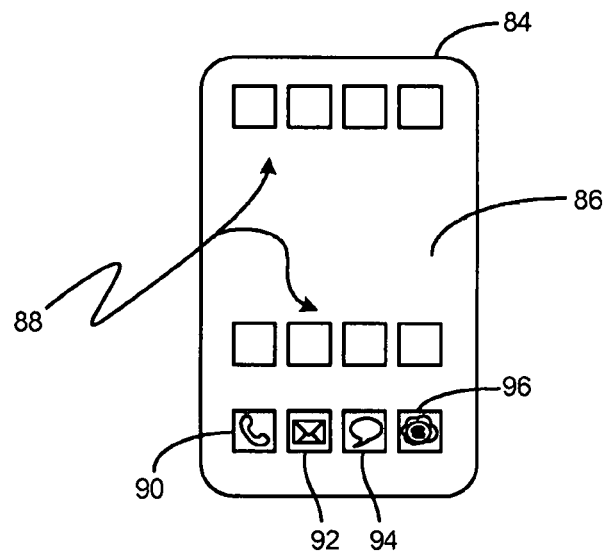

FIG. 3 shows a tablet computer 70 running the code of the present method. Computer 70 includes a display/user interface 72, at least one processing unit 74 run by a clock 76, a ROM 78 for non-volatile information, a RAM 80 for storing code and for program space, and an I/O block 82 for input and output of information, including audible alarms, to computer 70. Code for running the method of the present invention is stored in RAM 78 or ROM 80 as the CPU 74 requires, and CPU 74 controls sequencing of the functionality of the enhanced browser method. Display 72 displays the contents of bus 20 which includes documents changed according to the present invention onto the surface of tablet computer 70.

A smart phone 84 is also briefly shown and described in FIG. 3. It includes the same functional components and functionality as does computer 70. On its display surface 86, several rectangular icons representative of programs resident in smart phone 84 are shown generally at 88. Along with standard icons for communicating with others at 90, an e-mail icon at 92 and a texting icon at 94, computer 84 displays a browser icon representing the enhanced efficiency browser of the present invention at 96. Workers skilled in the art recognize that the enhanced efficiency browser of the present invention is equally able to be ported to a desktop computer as well as any mobile device as described in FIG. 3.

Figure 4A:
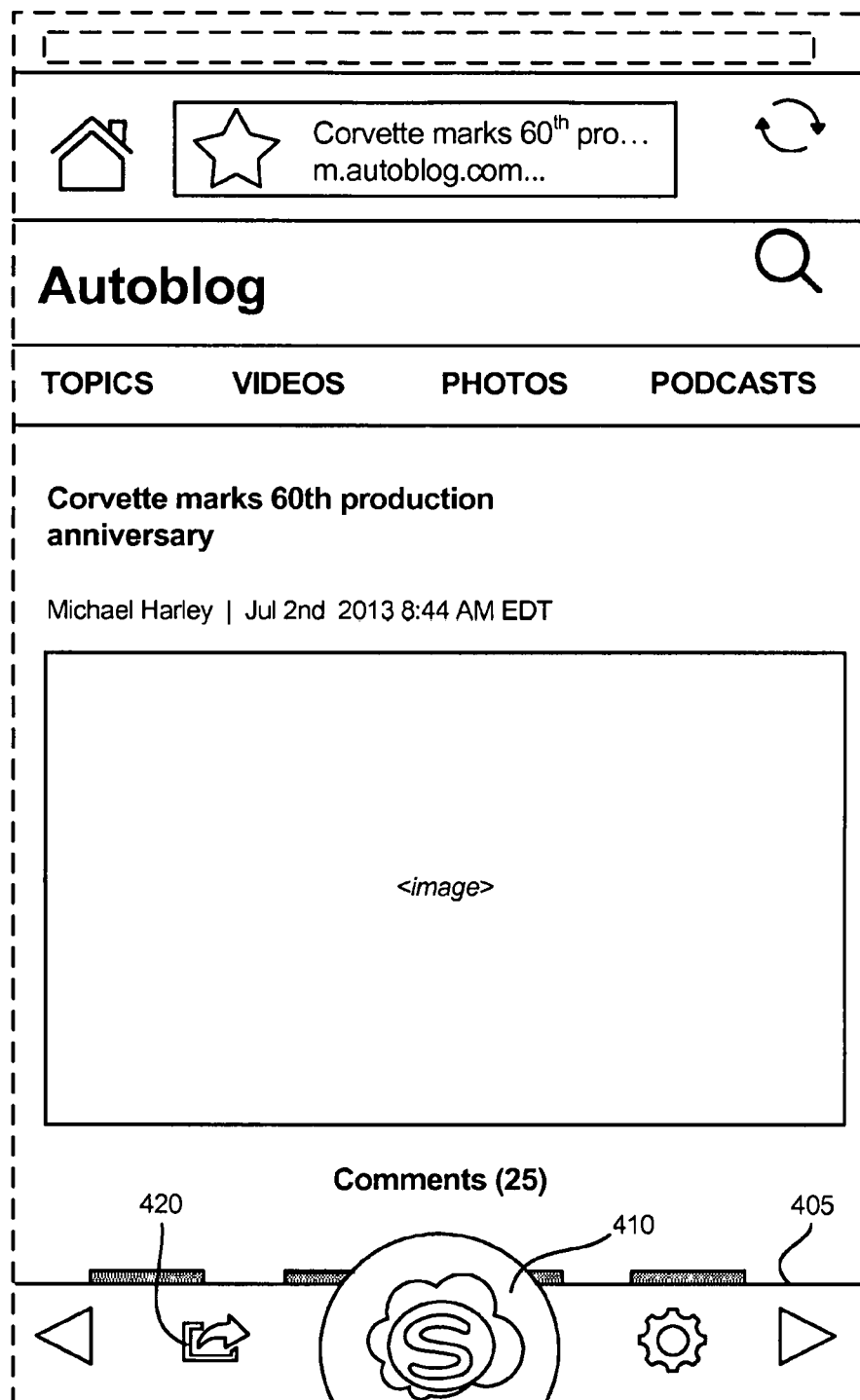
FIGS. 4A-4E show examples of screenshots, generally taken before and after executing the method of the present invention, using various keywords and user control parameters.
Figure 4B:
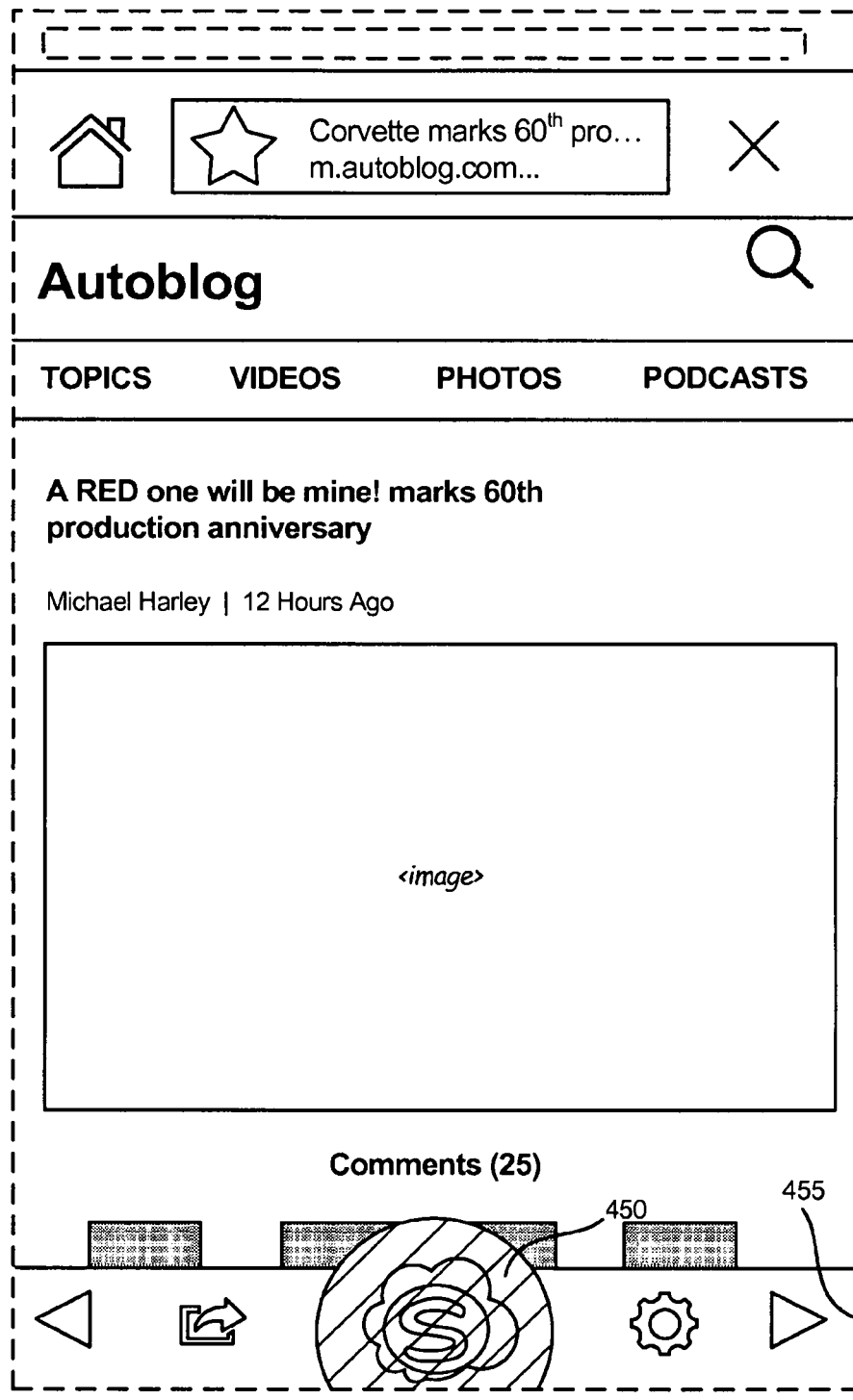

FIGS. 4A-4B are screenshots from an iPad running the method of the present invention. In FIG. 4A, the user initiated a search in Autoblog.com which resulted in an article titled "Corvette marks 60$^{th}$ production anniversary". Toolbar 405 is shown at the bottom of FIG. 4A in a grey tone rather than in color, and the change in color is an aspect of the invention as it indicates whether the enhanced efficiency features of the browser are activated. The color difference in the toolbar between FIGS. 4A and 4B illustrates the difference user 10 sees when the browser efficiency features are turned off and on, respectively. A colored central button indicates the efficiency features of the browser are turned on and a grey tone button indicates that those features are turned off. The central location of button 410 within the toolbar is also intentional; with the button's prominence in both position and relative size of icons on the toolbar, it easily allows the user to access the efficiency enhancing features of the method of the present invention. Button 410 selects a pop-up screen or the like which allows user 10 to select that document as a favorite, which is later available to identify as part of a collection. Collections are groupings of user selected documents (URLs, RSS feed pages or PDFs) identifiable by an icon, highlighting or a style. In another aspect of the present invention, collections are e-mailable to other users and for those users who have the browser of the present invention, the original user's keyword and user control parameters are transferred to the other user in the e-mail, so that the second user is able to browse their documents with the first user's keyword and user control parameters. This aspect of emailable collections is particularly helpful in education, where a teacher can identify keywords in their browser, identify collections of keywords and later e-mail the collection to their students, allowing them to focus more efficiently on important topics. Button 420 on toolbar 405 allows for emailing a link of the presently viewed page to another user, and optionally, a collection.

FIG. 4B shows the results of the same screen from Autoblog.com, but after having entered the user control parameter for a warp to replace "corvette" with the phrase "a RED one will be mine!" Note that the text within the headline including the replacement is also reformatted to account for the length of the replacement phrase for the warp. Squint button 450 at the bottom of toolbar 455 in FIG. 4B is now in color, as user 10 has selected the Squint button to initiate the process of the present method and replace "corvette" with "a RED one will be mine!". Note that any occurrences of the word "corvette" on the document will be changed to the phrase "a RED one will be mine!".

Figure 4C:
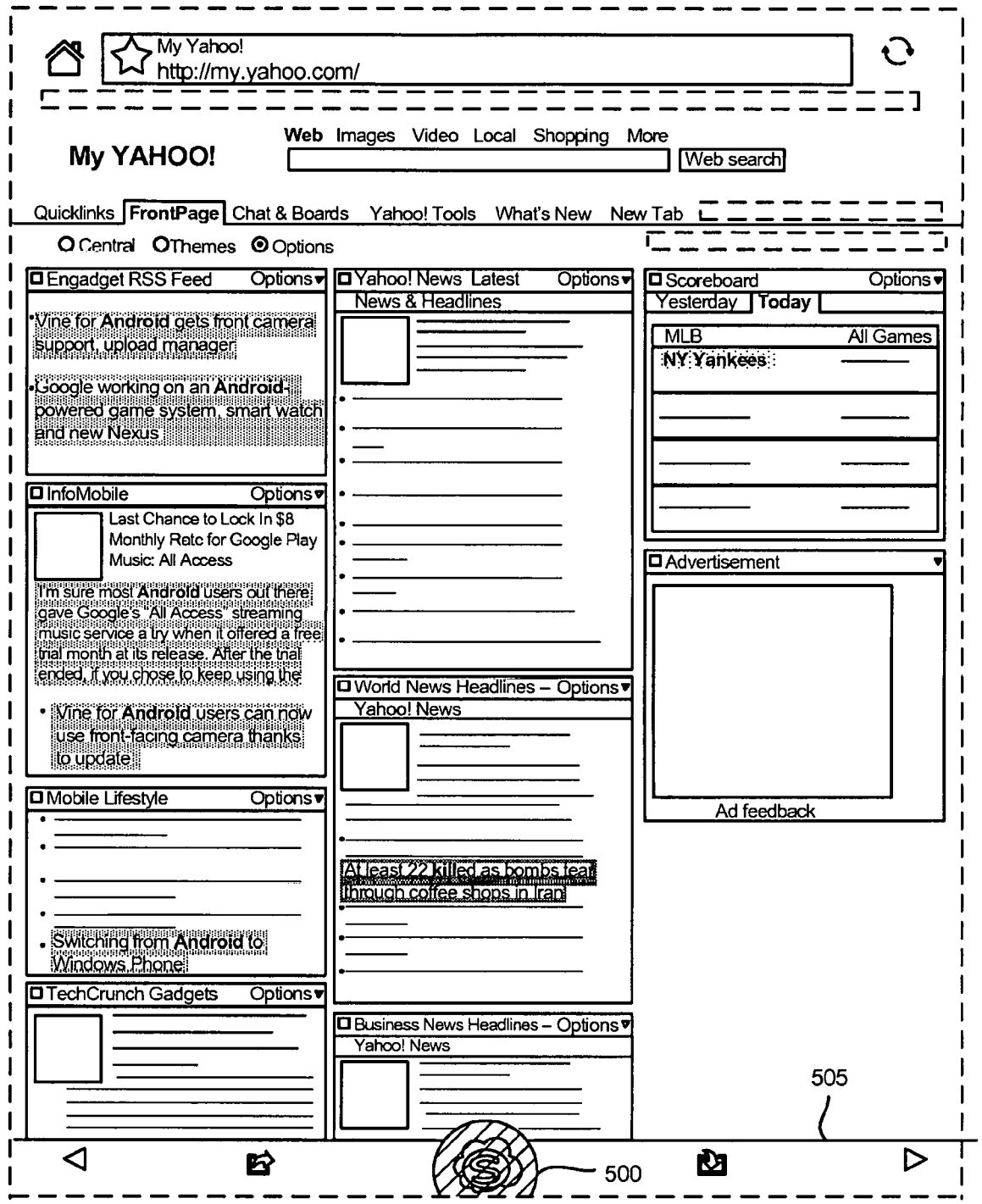

FIG. 4C shows a screenshot from a personalized Yahoo page, with keywords "Android", "kill" and "Yankees" selected and highlighted in green, purple and blue, respectively. The Squint button 500 in toolbar 505 is in color, indicating that the efficiency features of the browser are activated. There are five instances of the keyword "Android" on the document, and all of them have been highlighted appropriately to draw the user's attention to anything pertaining to Android. In the same fashion, the other two keywords, each having a single occurrence on this page, are highlighted according to the entered user control parameters.

Figure 4D:
Figure 4E:
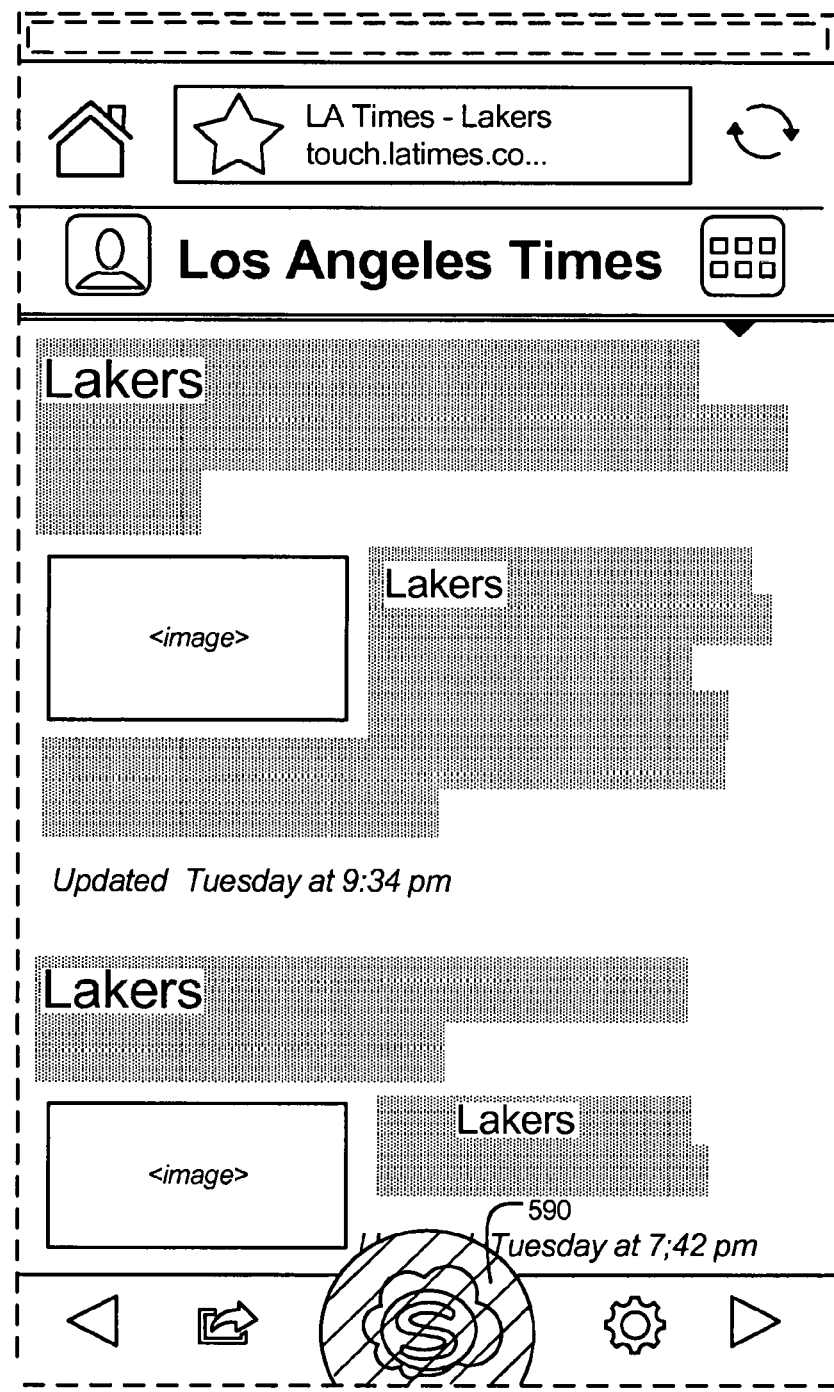

Finally, FIGS. 4D-4E are before and after screenshots of the browser with a snip user control parameter. In FIG. 4D, user 10 selected a document from touch.latimes.com featuring news about the LA Lakers. Toolbar 580 includes a squint button 585 in greytone, indicating that the browser is not activated. FIG. 4E shows the same LAtimes page, but after the browser has been activated. A browser icon button 590 is now colored, indicating that the browser is operating. User 10 entered a keyword of "laker", and his proximity user control parameter is set to paragraph, so that any subsequent viewing of documents will omit each paragraph including the work, "laker". User 10 indicated that he wished to be reminded of this omission via user control parameter color.

Figure 5A:
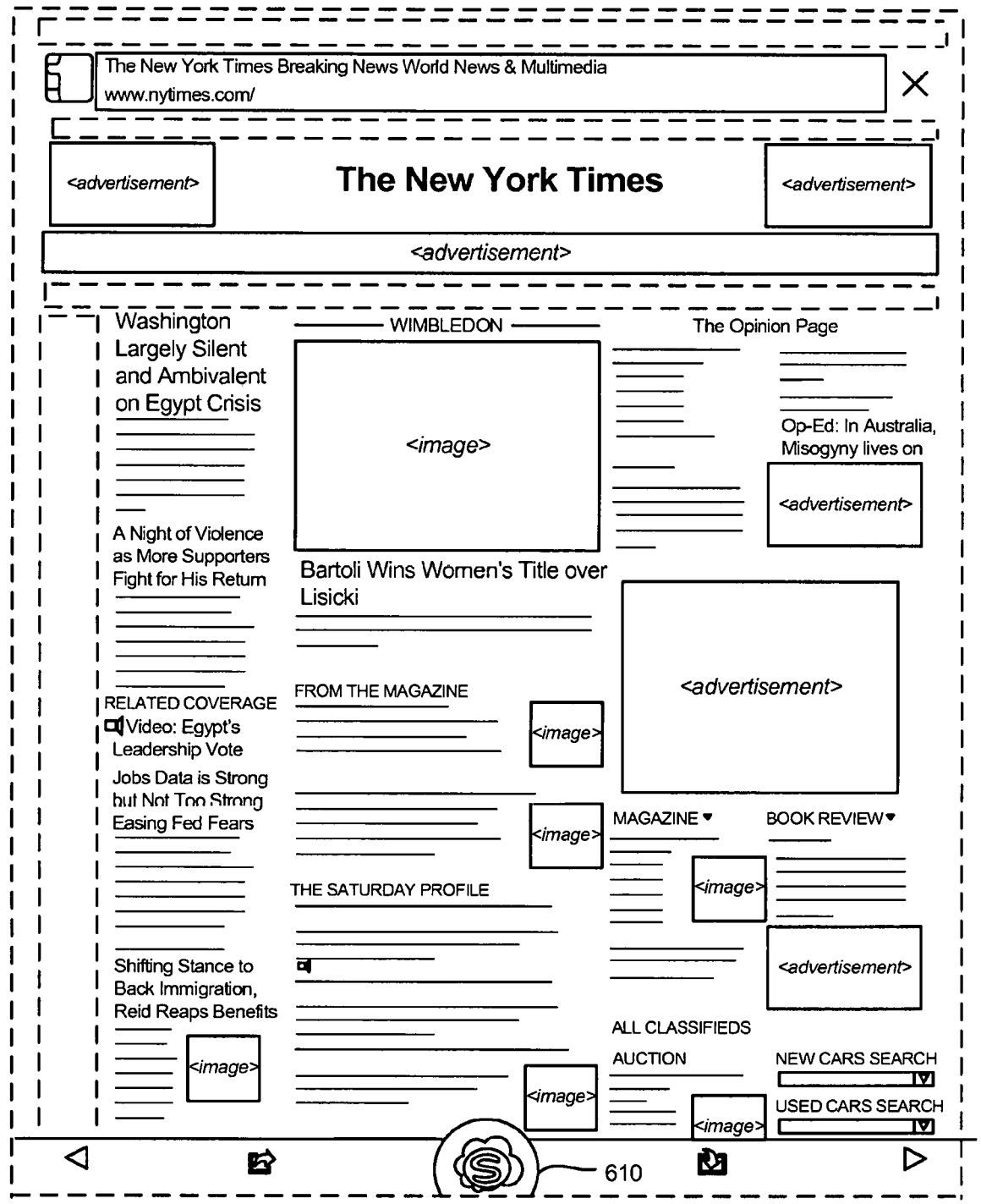
FIGS. 5A-F show how one embodiment of the user interface works, starting from an original browser screen marked with one keyword and ending with that originally marked keyword and a newly entered keyword.
Figure 5B:
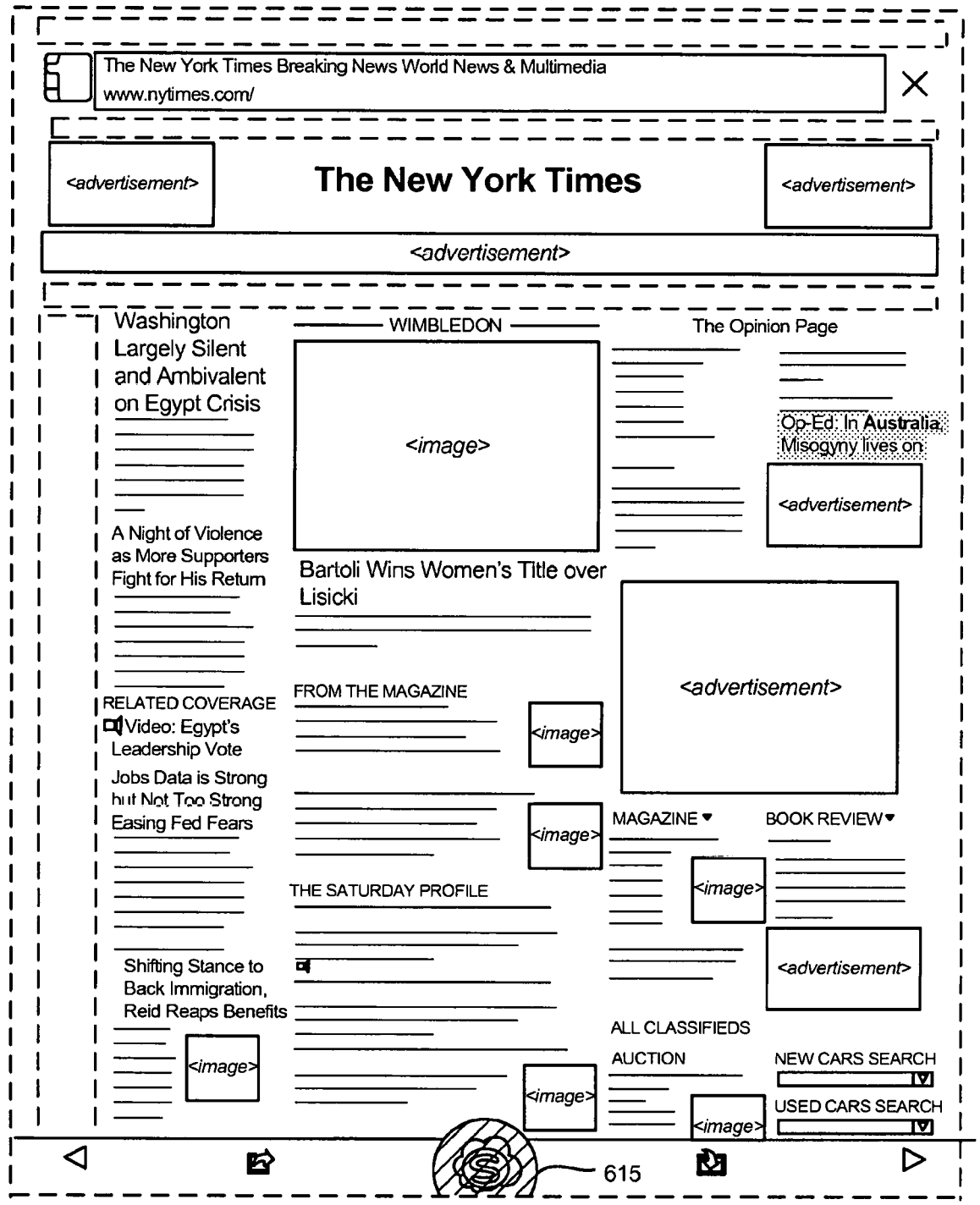
Figure 5C:
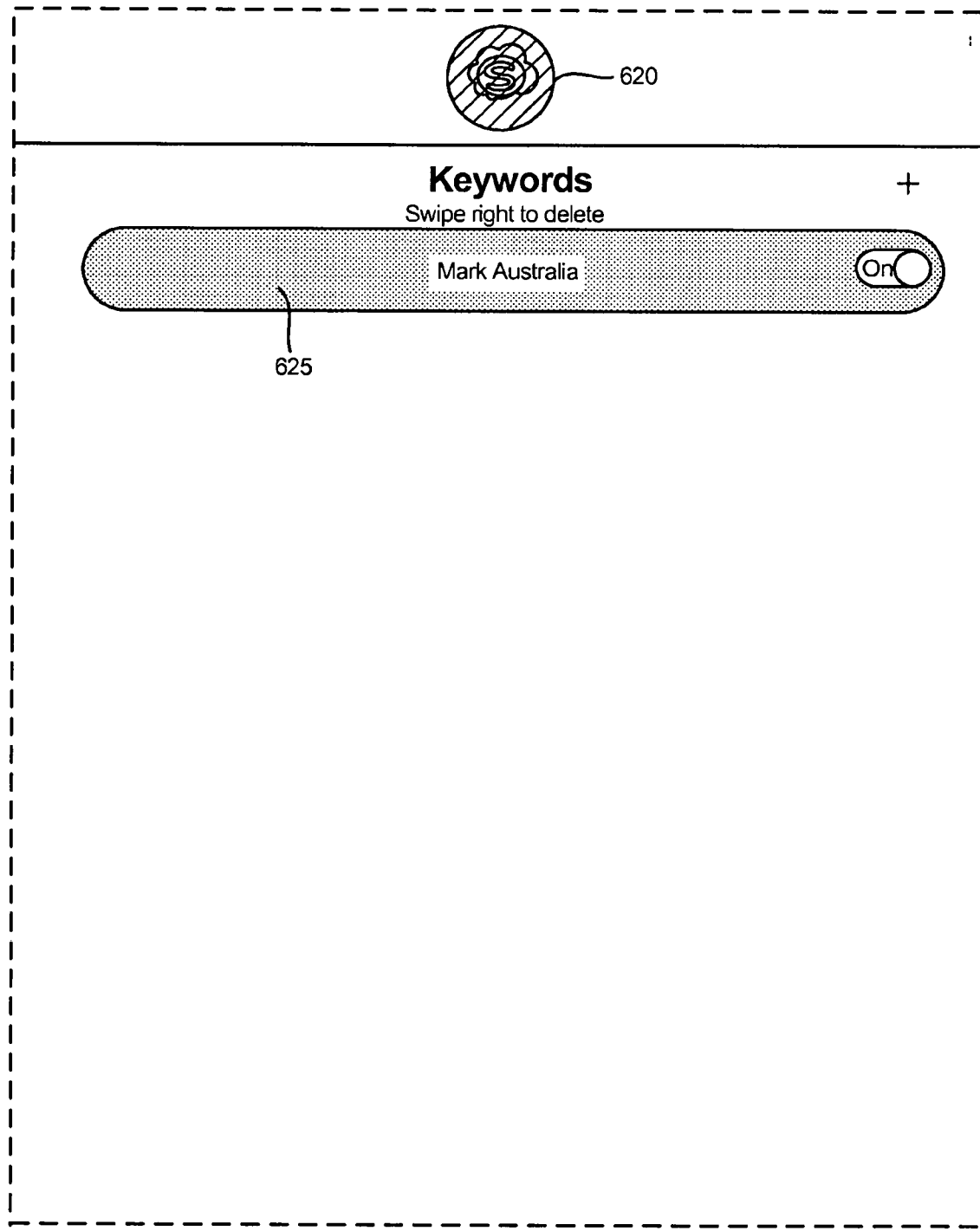
Figure 5D:
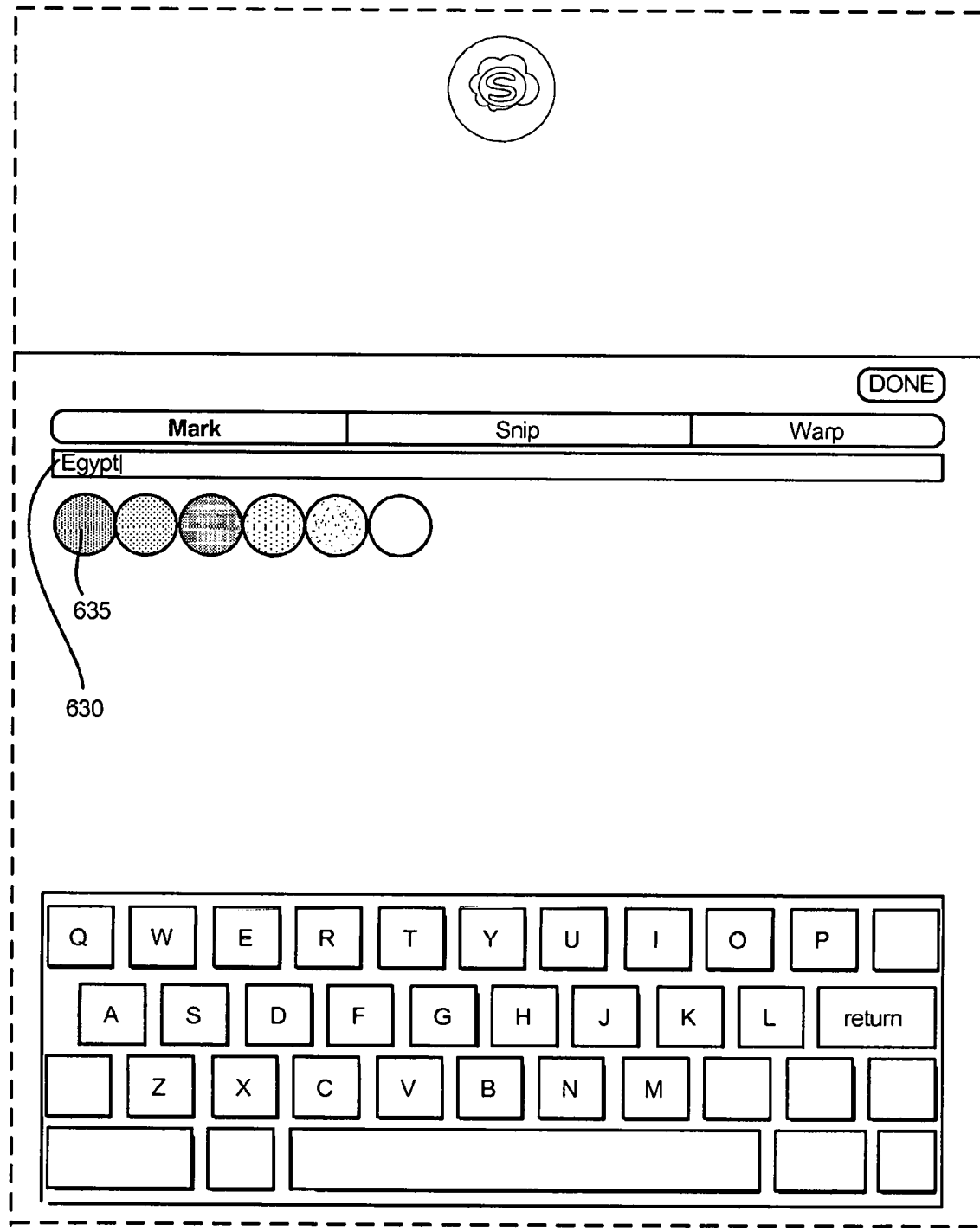
Figure 5E:
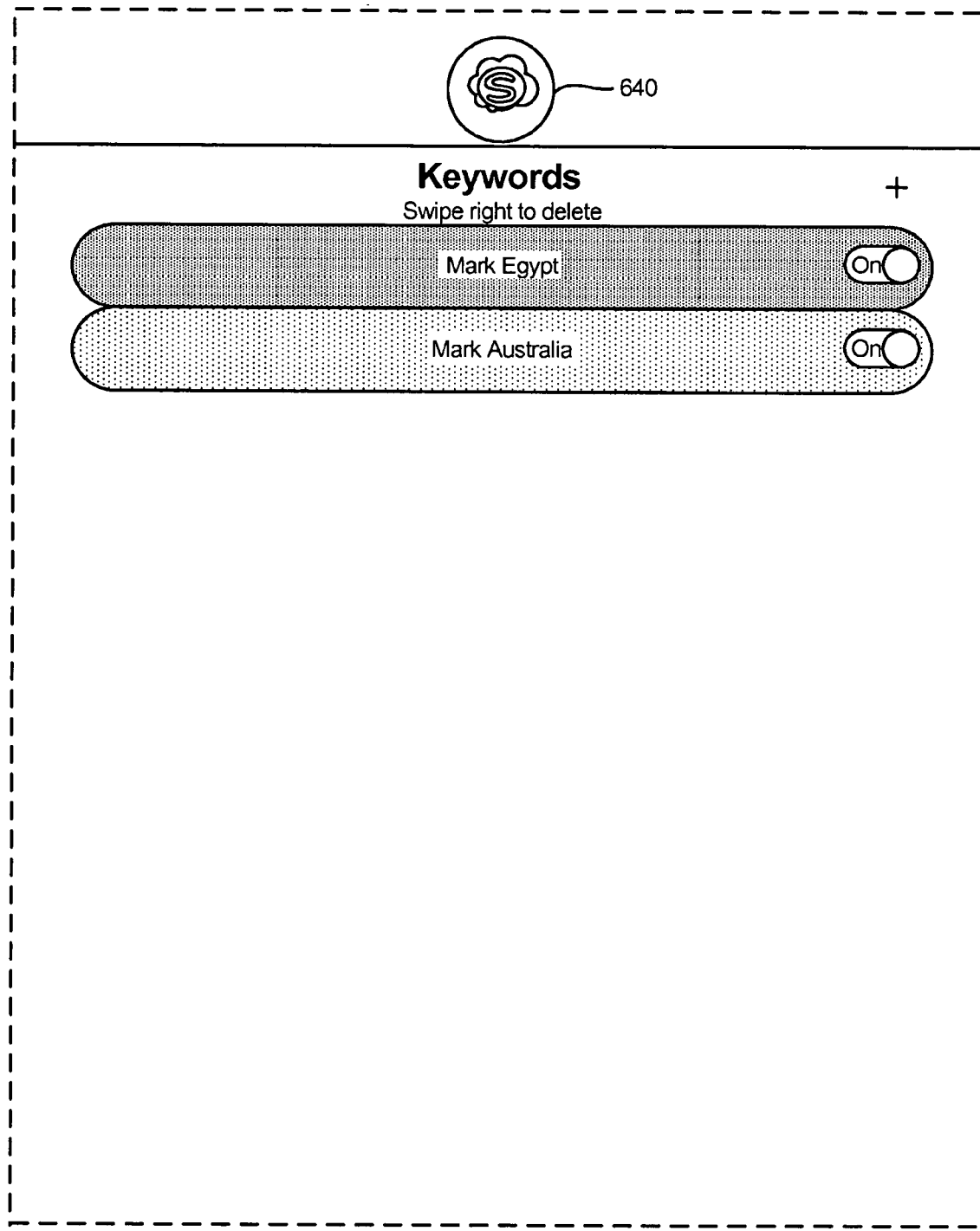
Figure 5F:
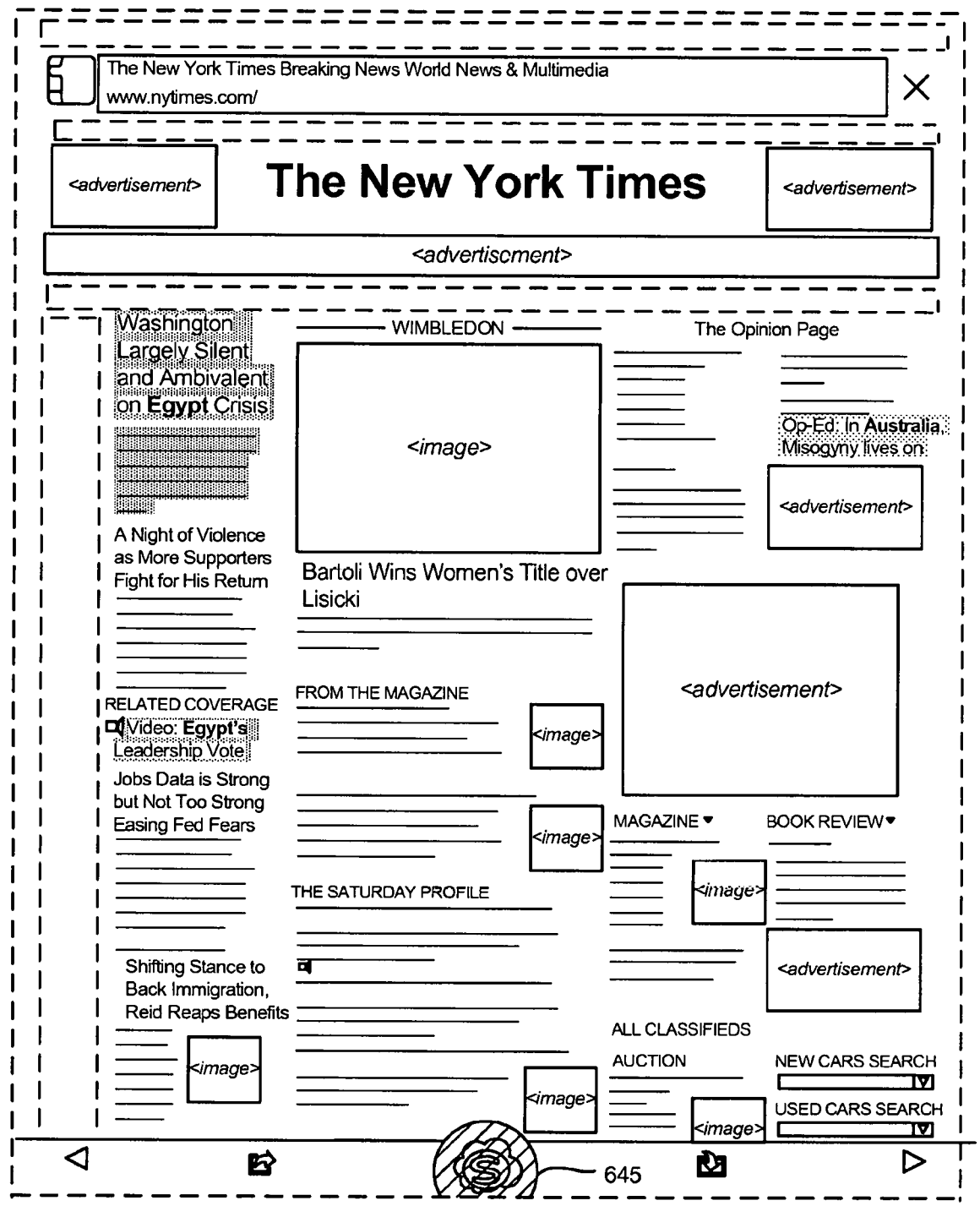

FIGS. 5A-5F show a further embodiment of the user interface in block 5 of FIG. 1, which is particularly useful for modification of keywords and user control parameters while user 10 is browsing. In FIG. 5A, user 10 selects the page at nytimes.com, and notices that that there are two newsworthy items of interest: news about Cairo and news about Australia. Center button 610 is not in color as user 10 has not yet activated it. In FIG. 5B, user 10 turns on center browser button 615 by pressing it once, and the single headline on the page is marked in yellow and "Australia" is boldened, indicating that a keyword of "Australia" is already saved. In FIG. 5C, user 10 dragged central button 620 upwards, and the keyword tab 625 shows the keyword (Australia) and displays the color of the mark for that keyword. FIGS. 5D-E show the keyword and user control parameter interface while user 10 adds a new keyword, "Egypt" at 630 to the screen as a mark, and selects orange as its marking color (at 635). User 10 presses "done". FIG. 5E shows the screen after "done" was entered, showing that both "Egypt" and "Australia" are keywords. User 10 again taps the central browser button to indicate all desired keywords are entered. Finally, FIG. 5F shows the browser activated at 645 (central button colored), and the two resulting highlights from the original keyword of "Australia" and the newly entered keyword of "Egypt", marked in orange.

Figure 6:
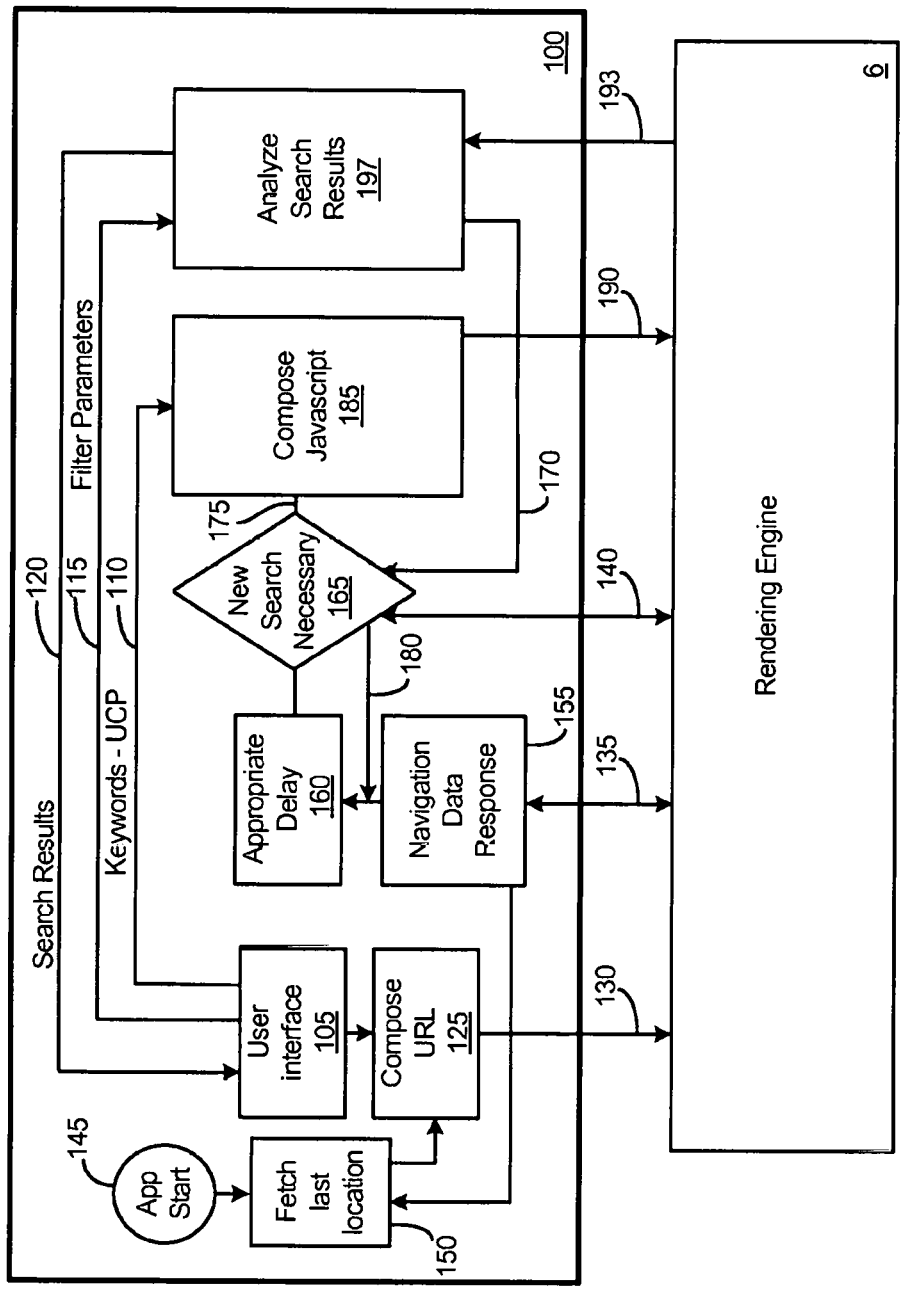
FIG. 6 illustrates another aspect of the present invention, further describing a preferred interface between the application 100 and the rendering engine 6.

Now turning to a different aspect of the present invention, FIG. 6 shows a more detailed view of enhanced efficiency browser application 100. A user interface 105 allows a user to enter a URL of interest. It also allows for user initialization of keywords (mark, snip and warp), and each of their associated user control parameters (signal 110). It also allows for user entry of filter parameters on signal 115, and provides a display of search results from signal 120. Once entered, interface 105 sends the desired URL to compose URL box 125.

As discussed earlier in this document, RE 6 is UI Webview software, created by Apple. RE 6 is written in and receives information in HTML, which is now codified by W3C and since 2000, is recognized as an international standard (ISO/IEC 15445:2000), herein incorporated by reference. According to Wikipedia's entry on HTML as of the date of filing, HTML describes the structure of a web page along with commands for presentation, making it a markup language rather than a programming language. HTML elements from the building blocks of all web pages. It provides a means to create structured documents by denoting structural semantics for text such as headings, paragraphs, lists, links, quotes and other items. It can embed scripts written in languages such as JavaScript which affect the behavior of HTML web pages. The purpose of a web browser is to read HTML documents and compose them into visible or audible web pages. The browser does not display the HTML tags, but uses the tags to interpret the content of the page.

Browser software 100 relies on two important signal sequences between itself and RE 6. The first signal sequence involves signals 130, 135 and 140 and relates to knowing when RE 6 has provided app 100 with the page the user sought to find.

To show how this first signal sequence occurs in detail, start at "APP START" in box 145. By default, the location of the last viewed web document is fetched from memory at box 150. Next, box 150 properly formats the web document address depending on user selected preferences representing either the last document of the user's interest, a freshly entered URL, or entered multiple search tennis. Once formatted properly, the desired URL goes to RE 6 on signal 130 and RE 6 locates the page of interest.

Once the page is located, RE 6 sends a "finished loading" signal at 135. Upon receipt, "navigation data response" box 155 sends a request to RE 6 on signal 135 asking for both the URL and the title of the currently viewed document. The "finished loading" signal may be returned from RE 6 multiple times during the course of viewing a document, regardless of whether the requested page is being initially loaded or whether some element of an already viewed page has been modified. A single user request to load a specific page may sometimes require several subsequent loads to completely load the desired page. This serial loading process occurs when RE 6 recognizes an instruction for a different resource external to the desired page. In this process, the user first sees a partially loaded page, and then, as other resources (e.g., files or images) are made available to the rendering engine, the page is serially composed through multiple loads.

The output of box 155 ports to function box 160 "appropriate delay", which starts a timer empirically set to allow for the speed of the internet connection. A typical amount of time for the timer is 0.5 seconds. Once the appropriate delay is reached, two decisions are made about whether a new search is required, each decision being used in a preferred embodiment in tandem to maximize efficiency. However, the present invention can be practiced by using one or the other decisions exclusively, as will be apparent to users skilled in the art. "New search necessary" box 165 compares the last searched URL (from signal 170) to the currently loaded URL (on signal 140). Box 165 also compares whether the document has changed from the last search, such condition resulting from a comparison of the number of elements on the current page (on signal 140) and the number of elements on the previously searched page (from signal 170).

There are three conditions under which a new search will be automatically performed (signal 175). The first condition occurs when the previously searched URL is not the same as the currently loaded (browsed) URL returned on signal 140. Signal 140 is representative of environmental aspects of the currently loaded (browsed) page, including at least the URL of the currently searched document. In many cases the URL first requested (signal 130) contains instructions for additional page locations, resulting in a series of perhaps twenty such redirects from the originally dispatched URL. Other times, the page which the user seeks is updated while browser app 100 searches it. In any event, app 100 must operate on the most recently updated version of the web page sought, and this signal sequence allows newly updated information which flows from RE 6 to constantly flow back to browser 100. The second condition occurs when the current document has changed since the last search, as evidenced by a review of the number of elements on the presently loaded (browsed) page versus the number of elements on the previously searched page. Other measures of complexity of the page are possible to incorporate in the present invention, such as a checksum of the page or other such measures. If the first or second condition is not satisfied (i.e. that the document has been searched and the document has not been changed since the last search, control passes on signal 180 back to appropriate delay box 160, now increasing the amount of delay to approximately 2 seconds. The delay is increased because the system is in more of a steady state, with less activity, than it previously had been. The third condition is when the user changes their user control parameters or their keywords. A manual entry of a new search by the user will also create a new search. Once any one of the conditions is satisfied, signal 175 initiates a new search in 'Compose Javascript" 185.

Signals 130, 135 and 140 all relate to when to initiate a search for multiple keywords in the other section of app 100. Signal 130 initiates the sequence by sending a desired URL to RE 6, activity on signal 135 then follows, which represents a search, ie; activity from the rendering engine. Logic within app 100 determines when the rendering engine output is stable and finally, an initiate search signal 175 starts box 185 composing an appropriate search. With the sequencing of these signals 130, 135 and 140, the present invention embodies a dynamic search operation which allows for the incoming web page of interest to be modified while the present invention is operating. The logic which delays commencing a search on signal 175 prevents a jittery, interrupted presentation of a web page to a user, and is another aspect of the present invention.

The second important signal sequence is between signals 190 and 193, which starts under the condition that a search is necessary (signal 175). In "Compose Javascript" box 185, a command string instructing RE 6 with the keywords and user control parameters is formatted according to the present invention. Within the context of an HTML description of a page, it is well known in the art how to locate instances of a desired character string. One finds the desired character string within an HTML element, (the element containing the HTML commands for that part of the page, such as bold font type and other attributes of the keyword), and searches a small distance backwards within the HTML hierarchy for associated elements. In those applications, the desired search string is then returned to the application along with its associated formatting attributes. However, the present invention composes a command for a RE which locates all the instances of multiple desired keywords as a function of a user's browsing preferences, extending the HTML hierarchy search to associated HTML elements far before and far after the located keyword, including images, text and URLs related to the keyword and appropriately selects those associated HTML elements as a function of the user's browsing preferences. The RE then returns the requesting information and the browser app appropriately parses the returned information, formatting it and presenting it to the user according to their preferences.

"Compose javascript" box 185 formats keywords and user control parameters according to javascript format to initiate a search. For a three keyword search, one keyword with a mark, one keyword with a snip and one keyword with a warp, the general format for a javascript command to RE 6 is shown below, with one of the parameters for the four parameter snip having a null in it:

name of function([{searchterm:obama, type:snip, color: red, font:null, replaceTerm:null}, {searchterm:corvette, type:mark, color:red, font:null, replaceTerm:null}, {searchterm:obama, type:warp, color:null, font:null, replaceterm: happy leader}])

Command string signal 190 commands RE 6 to search its current page for the keywords, the keyword control parameters needed for RE 6 to provide a marked, snipped or warped version of all the occurrences of keywords on the current page. After issuing the command string, RE 6 evaluates the function described by the command string, and responsively returns on signal 193 a long text string which represents occurrences of the located keywords in their context as a function of the proximity user control parameter related to that keyword, a unique identifier of each instance of each located keyword (so each change the browser makes is uniquely identifiable), any associated URLs which RE 6 may have found, the x and y coordinates of each located element and the URL of any associated images. The number of elements on the current page and the URL of the page is also returned on signal 140, and those two quantities which describe the state of the page when the search occurred later are stored (see signal 170), to be used later to determine when the current page should be searched again. The difference in time between sending signal 190 and receiving results on signal 193 is approximately 0.10 seconds per keyword, but is also a function of the hardware in use. The time required is linearly proportional to the number of keywords.

In Analyze Search Results box 197, the information on results signal 193 is parsed into usable pieces relating to each instance of each keyword, applying user defined or defaulted filters via signal 115, which improve usability of the returned data. For instance, one filter setting removes duplicate keyword occurrences and another removes orphaned text strings. Analyzed search results are returned to user interface 105 to display to the user.

Figure 6A:
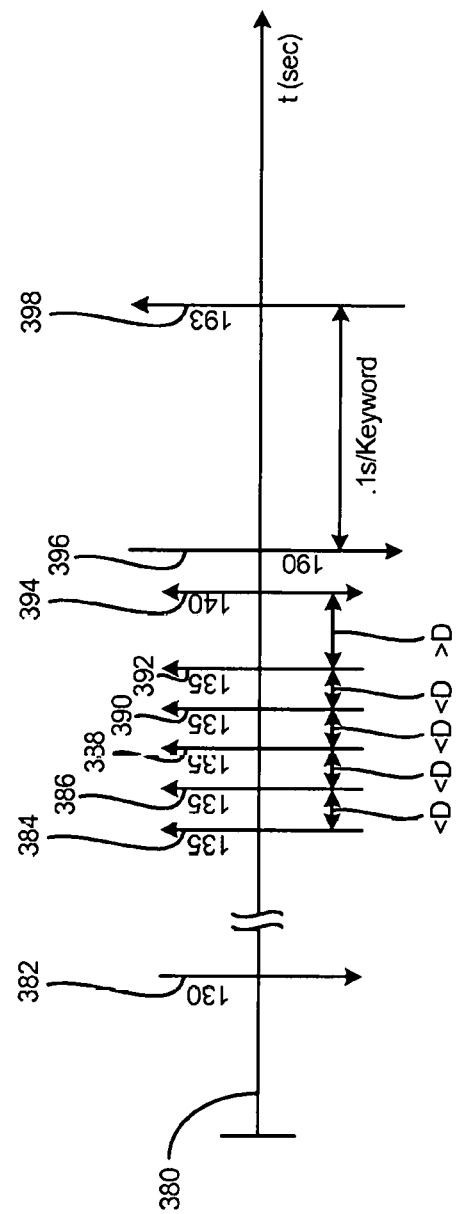
FIG. 6A shows a timeline of important signals described in FIG. 6.

FIG. 6A depicts the initiation over time of important signals and operations within browser app 100. On a graph 380 of time (t) in seconds, signal 10 representative of a URL to search is sent to RE 6 at 382. Reference designator 382 corresponds in time to "x" seconds. Next, at reference designator 384, signal 135 representative of a "finished loading signal" occurs after signal 130 occurred. This is followed by four more instances of "finished loading signal" on signal 135, shown at reference designators 386, 388, 390 and 392. Each such instance of signal 135 is separated in time by less than D (as fixed by appropriate delay box 28). As more than D seconds have elapsed since the last "finished loading signal" on signal 135, signal 140 becomes active at 394, which means that the logic in "search necessary?" box 165 was executed and signal 175 was active (not shown). Separated only by the computation time necessary to compose the search strong for RE 6, signal 190 goes active at 396. Next, depending on the number of keywords, RE 6 executes a search for each search, which takes about 0.1 seconds per keyword, showing results on signal 193 at 398. For the entire browser, a typical search of about 30 keywords takes about 5 seconds.

Note that the preceding paragraph details operation for manual submission of a URL by a user, in which case the multiple instances of signal 135 (384, 386, 388, 390, 392) occur without signal 130 being sent to RE 6. Such instances commence under very common circumstances, like the continuous feed of a Facebook page. This automatic updating of the web page is an essential feature of the invention, as it does not require manual intervention to smoothly update the page of interest.

Figure 7A:
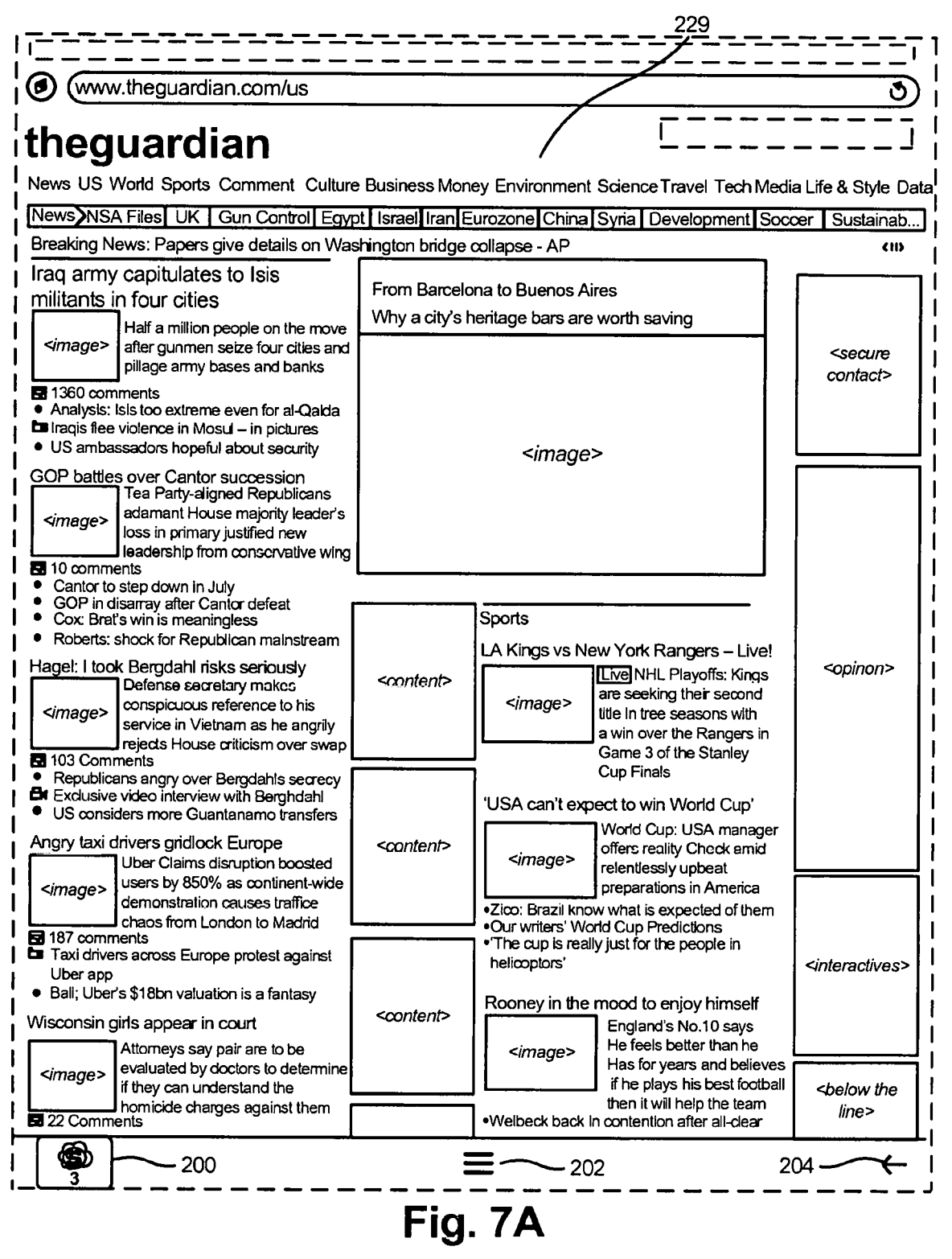
Figure 7B:
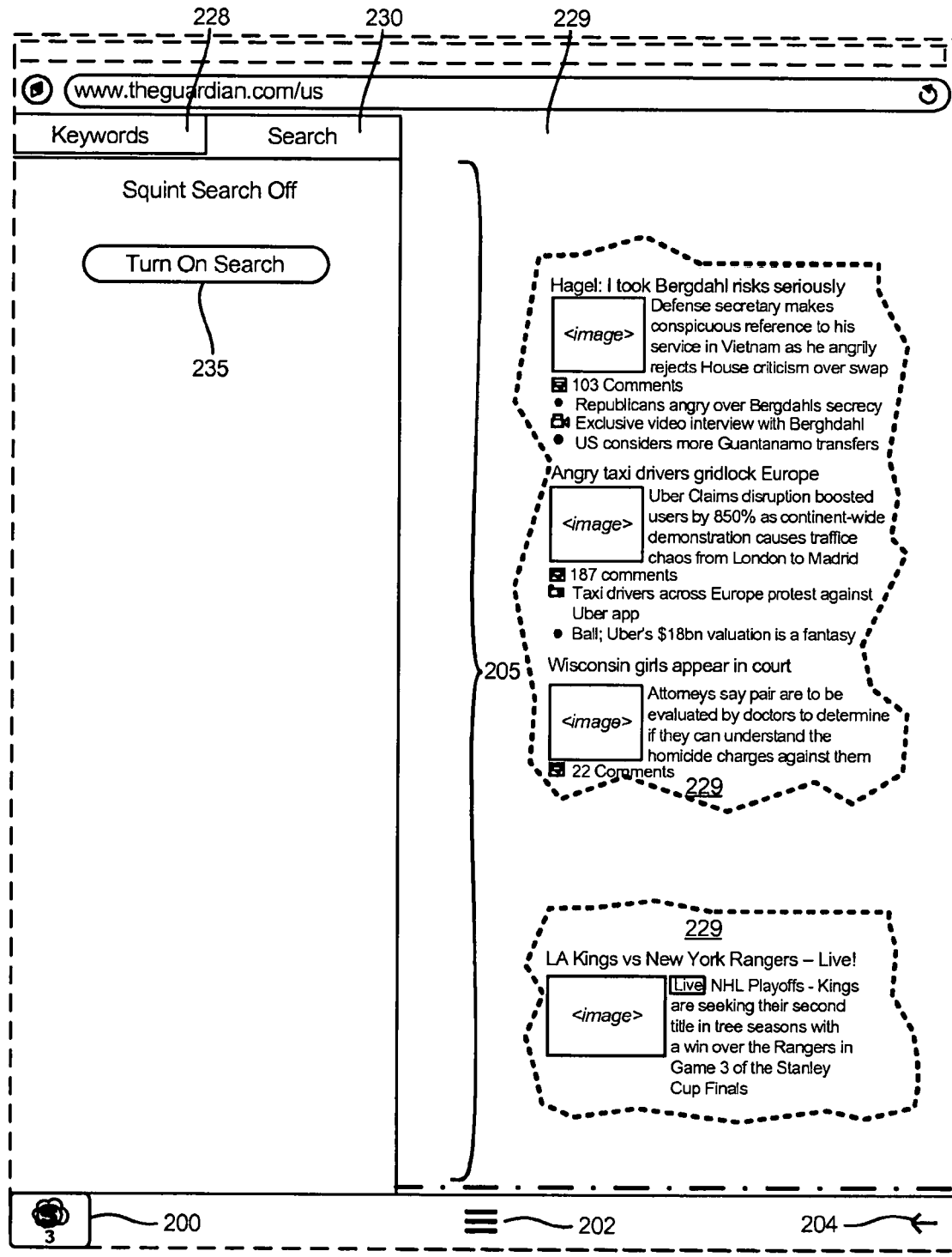

FIGS. 7A-F show various aspects of how the software of the present invention operates. User typed "theguardian.com/us" into app 100, and the resulting display is shown in FIG. 7A, with no modification of the present URL by browser app 100, other than appending a toolbar across the bottom of user's screen. The toolbar includes, from left to right, a Squint button at 200 (shows in grayscale as indicating no modifications are currently present on the page), a three bar symbol at 202 allowing user to access and modify their browser controls, and a left arrow symbol at 204 for initiating a re-load to the previous page accessed. A right arrow will also appear for access to a forward page if one is available.

Figure 7C:
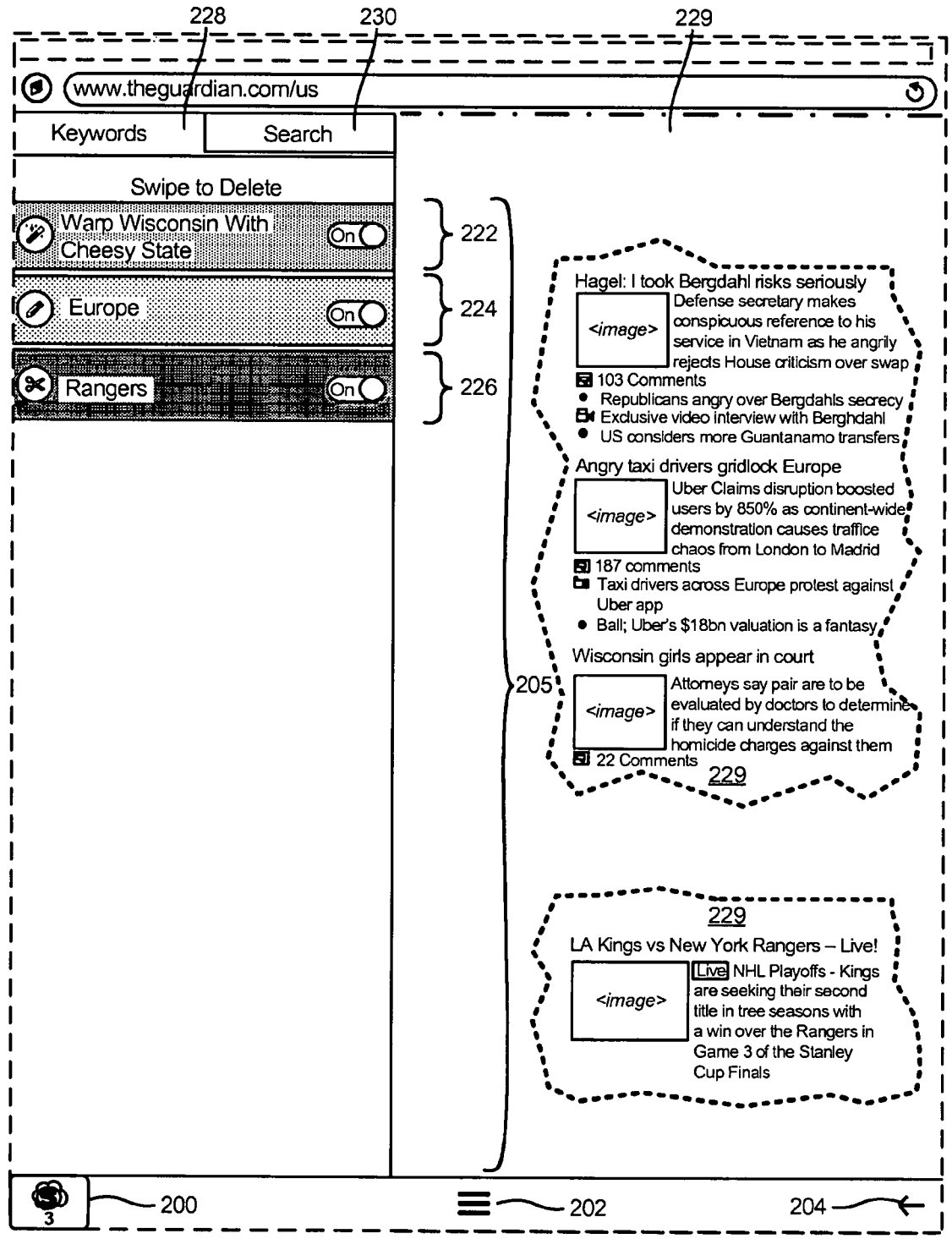

In FIG. 7A, the user selects the Keyword/Search panel 205 by tapping the Squint button (at 200) once. In FIG. 7B, the user then selects Keywords by tapping button 228 near the top of Search panel 205. In FIG. 7C the Keyword panel 228 is selected, allowing user to review and edit their keywords and command selections.

Figure 7D:
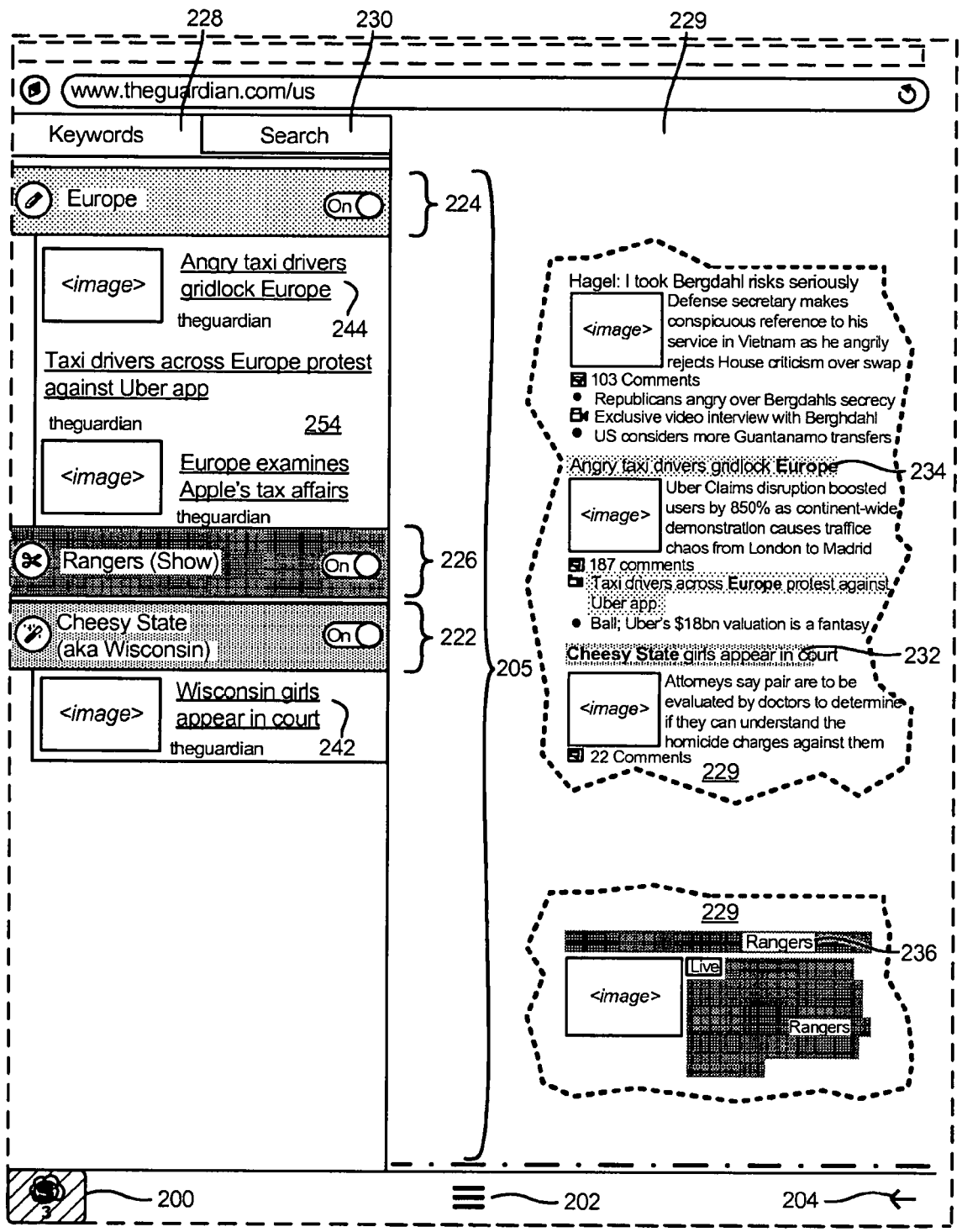

Although this action is not shown in the drawings, FIG. 7C lists the user's keywords. User has selected "Wisconsin"

as a keyword and has chosen to warp (replace) it with "Cheesy State". Similarly, user has selected "Europe" for another keyword and chooses to mark (highlight) it in yellow. Finally, the user has entered "Rangers" as a keyword and selected snip for its associated function user control parameter. In particular, FIG. 7C shows that the warp of "Wisconsin" with "Cheesy State" appears at 222, the mark of "Europe" appears at 224 and the snip of "Rangers" appears at 226 summarizing the keywords 228 section of the 'Keywords" panel 205. In practice, any word or phrase, including numbers or other characters, could be used in a warp. In FIG. 7C, the user toggles to a Search panel by selecting Search button 230 at the top of the Keywords panel 205. Again in FIG. 7B, user prepares to push the 'Turn On Search" button at 235. Alternatively, "Turn on Search" may be toggled on/off by a quick double-tap of Squint Button 200. Squint button 200 animates during the search then changes from grayscale (FIG. 7B) to full color (FIG. 7D), indicating that Search is active. Squint button 200 now shows in full color and includes a "3" representative of the three keywords found on the page as an indicator to the user as to their possible interest in the page. Now with Search fully enabled, FIG. 7D shows the results of searching the present page of theguardian.com/us with the keywords and associated user control parameters which the user entered. In particular, FIG. 7D shows that within browser window 229, the user sees a full page display of their URL of interest (theguardian.com/us) with three occurrences of the keyword "Europe" highlighted in yellow (one example is shown at 234), a single occurrence of keyword 'Rangers" shown blacked out at 236 according to user's preference (presumably because user did not want to know the outcome of a game), and the single occurrence of the keyword "Wisconsin" warped with "Cheesy State" and shown in blue at 232. Now at FIG. 7D with search side panel 230 selected, a complete summary of the three keywords "Europe" with three headlines showing at 254, "Rangers" with no headlines showing and "Wisconsin" with one headline showing at 242. Two images were found in the search and are displayed in a spot corresponding both to their keywords and associated headlines.

Figure 7E:
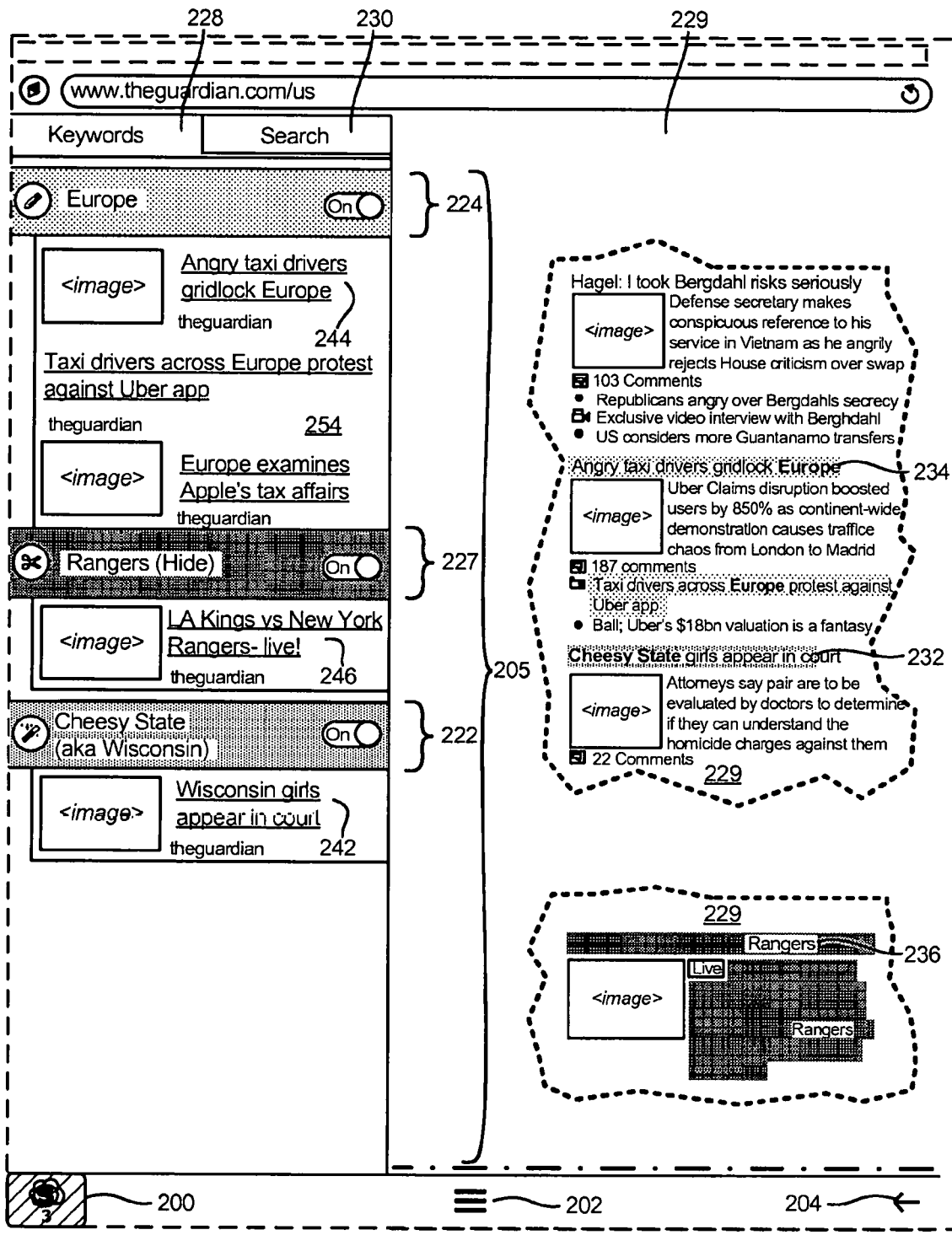

The user can choose to direct the browser window to a URL contained in a hyperlink by tapping the links returned in Search panel 205. For example, browser app 100 located the headline in FIG. 7D "Angry taxi drivers gridlock Europe" (at 234) and highlighted it in yellow. If the user in FIG. 7D were to touch either the Europe keyword hotlink on panel 230 (at 244) or the highlighted headline (at 234), the next screen would show user the article about that headline by going directly to its URL. In similar fashion, browser app 100 located the "Wisconsin" keyword, replaced it with "Cheesy State" and highlighted it and surrounding text in blue (at 232) according to the user control parameters about the "Wisconsin" keyword, and (at 236), blacked out the occurrence of "Rangers" according to the user control parameters related to "Rangers". Now with Search still fully enabled (see that Squint button 200 in FIG. 7D still appears in color), user chooses to show the contents of snipped keyword "Rangers" by tapping keyword "Rangers (Show)" (at 226). In FIG. 7E, "Rangers (Show)" has now changed to "Rangers (Hide)" (at 227) and reveals the single occurrence "LA Kings vs New York Rangers—live!" and its associated image (at 246). The user has modified the user control parameters about his selected snip of "Rangers" to allow himself to read the located headline including his "Rangers" snipped keyword, and in FIG. 7E (at 246), the headline including the snipped "Rangers" keyword is now shown to the user.

Figure 7F:
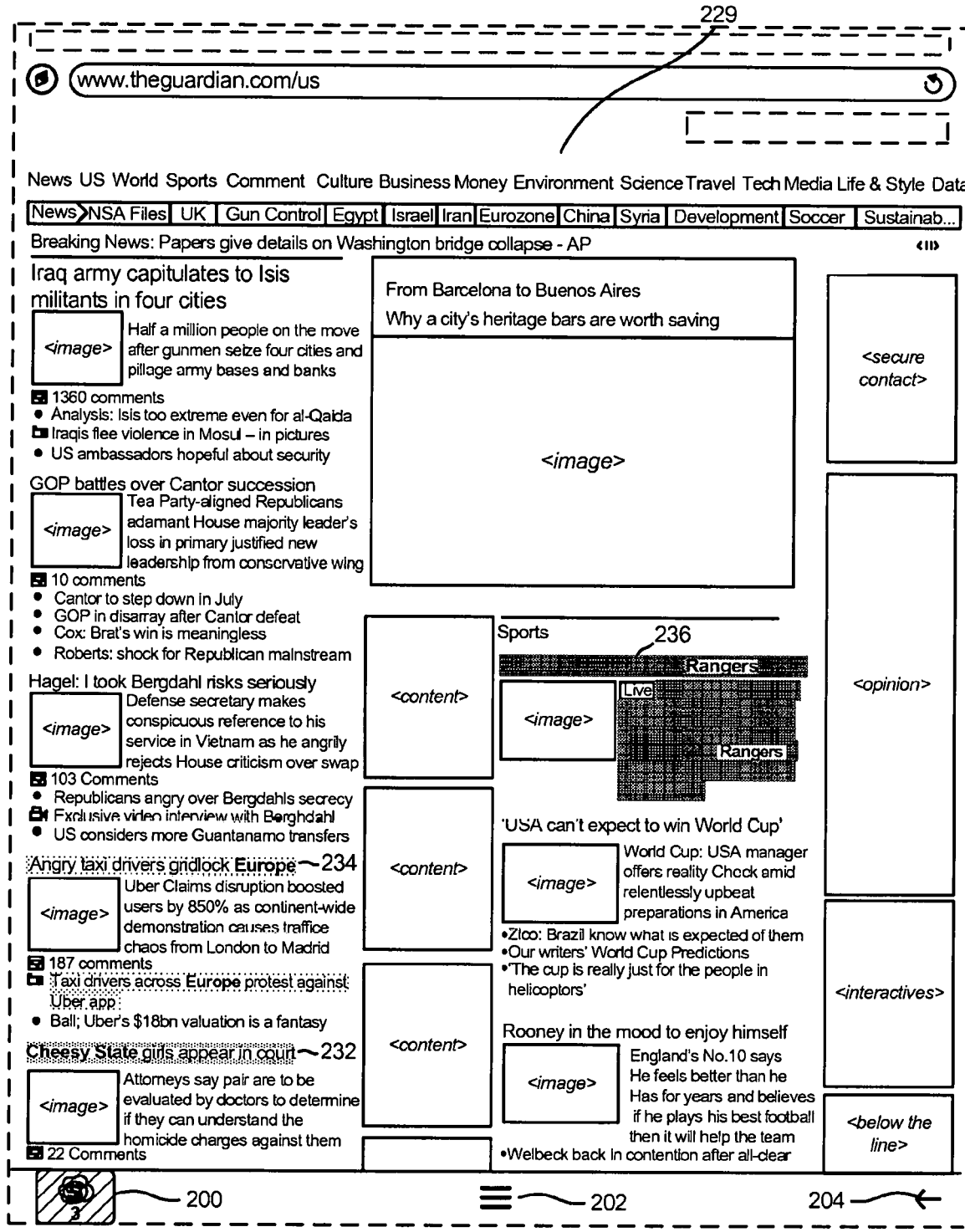

In FIG. 7E, user closes Search panel (230) by tapping the Squint button (200) once. Now FIG. 7F shows browsing window (229) in full screen with Search panel 205 closed and Squint button (200) in color, enabled and finding keywords and applying the user control parameters to the document.

While certain embodiments of the invention have been described herein, other embodiments may exist. Other representations of these processes are within the scope of the present invention and include, information stored in memory and other storage mediums, and information which can also be stored on or read from other types of computer-readable media, such as secondary storage devices (e.g., hard disks, floppy disks or a CD-ROM, a carrier wave over the Internet, or other forms of ROM or RAM). Further, the disclosed methods may be modified in any manner, including by reordering elements and/or inserting or deleting elements, without departing from the invention. Accordingly, the invention is not to be limited to any single embodiment, but rather is to be construed in breadth, spirit and scope in accordance with the appended claims.

Although the present invention has been described with reference to preferred embodiments, workers skilled in the art will recognize that changes may be made in form and detail without departing from the spirit and scope of the invention.

What is claimed is:

1. A process comprising:
for each of a plurality of keywords, entering and saving the keyword and its corresponding user control parameters, where a one of the user control parameters is a function user control parameter;
searching a currently loaded document for the plurality of keywords to find located occurrences of the keywords;
changing an area around the located occurrences of the keywords as a function of at least one of the user control parameters to form a changed document from the currently loaded document;
providing at least a portion of the changed document to a user;
providing a search area to the user comprising for each keyword of the plurality of keywords:
the keyword and an indication of how the area around each located occurrence of the keyword was changed as a function of the at least one user control parameter of the keyword to form the changed document, and below the keyword and the indication:
a separate summary for each located occurrence of the keyword, each summary comprising for each area around the respective located occurrence of the keyword in the currently loaded document, one or more elements from the respective area.

2. The method of claim 1 where the method processes the currently loaded document until all occurrences of the plurality of keywords are located and the area around each of the located plurality of keywords are changed according to their respective user control parameters.

3. The method of claim 2 further comprising a step for e-mailing the saved keyword and its corresponding saved user control parameters to another user.

4. The method of claim 1 where the user control parameters comprise a warp function user control parameter and a character string for replacing the keyword corresponding to the warp function user control parameter.

5. The method of claim 1 where the user control parameters comprise both a proximity and a font user control parameter.

6. The method of claim 1 where the user control parameters comprise a color.

7. A programmed computer, programmed to carry out the method of claim 1.

8. A method adapted for modifying a document, comprising:
   receiving an instruction to modify the document based upon stored functions, wherein each stored function has an associated stored keyword and there are a plurality of stored keywords;
   searching the document for each stored keyword of the plurality of stored keywords;
   for each stored keyword located during the search, performing the stored function associated with the keyword to modify the document to form a modified document; and
   displaying the modified document and a search area, the search area comprising a summary area for each stored keyword of the plurality of stored keywords, each summary area comprising:
      a legend comprising the respective stored keyword and an indication of the respective stored function associated with the respective keyword; and
      a plurality of summaries for the respective keyword each summary comprising the respective located keyword and one or more elements from the respective area wherein the legend is separate from all of the summaries.

9. The method of claim 8 wherein the stored functions comprise one of warp, snip and mark.

10. A programmed computer, programmed to carry out the method of claim 8.

11. A method for browsing continually updated web documents, the method communicating with a rendering engine ("RE"), the method comprising:
   entering and saving a plurality of keywords and corresponding user control parameters;
   determining that a presently loaded document is substantially different than a previously searched document;
   formatting and providing to the RE a search command as a function of the saved keywords and the saved user control parameters, the search command instructing the RE to modify the presently loaded document in a vicinity of the keywords according to the user control parameters to form a modified document;
   receiving from the RE a search result, the search result including a plurality of occurrences of each keyword and a set of contextual information related to each occurrence;
   parsing the search result to form parsed results;
   formatting the parsed results to group contextual information related to different occurrences of each keyword together into a respective summary area for each keyword thereby producing a plurality of summary areas wherein each summary area in the plurality of summary areas is headed by an indication of how the loaded document was modified for the keyword; and
   displaying the plurality of summary areas with the modified document.

12. The method of claim 11 where the user control parameters comprise a function control parameter, the function control parameter called a one of a mark, snip and a warp.

13. The method of claim 11 where the method includes a step for receiving and storing a URL from the RE of the previously searched document and wherein the step of determining that the presently loaded document is substantially different than the previously searched document comprises comparing the URL of the previously searched document to the URL of the presently loaded document.

14. The method of claim 11 where the step of determining that the presently loaded document is substantially different than the previously searched document comprises using a measure of complexity of the previously searched document and of the presently loaded document to determine whether the presently loaded document is substantially different from the previously searched document.

15. The method of claim 11 where the contextual information includes a one of a hyperlink and a URL representative of an image and a character string.

16. The method of claim 11 where the step of parsing includes filtering the search result.

17. The method of claim 11 where the parsed results are dynamically presented.

18. The method of claim 11 wherein formatting the parsed results comprises formatting the parsed results within one of a side panel, a second window, a panel parallel to a main browsing window and an overlay.

19. A method adapted for displaying and modifying a document, comprising:
   receiving and saving a plurality of keywords and a respective function for each keyword;
   after receiving and saving the plurality of keywords and respective functions, receiving a request for a document;
   retrieving the document;
   rendering the document;
   rendering an icon representative of the method with the document;
   receiving an indication that the icon was selected and in response searching the document for the keywords and performing the respective function when a keyword is found in the document; and
   rendering a search area comprising a separate summary area for each of the plurality of keywords, each summary area comprising:
      a legend comprising a respective one of the plurality of keywords and an indication of the function performed for the respective one of the plurality of keywords; and
      elements of the document found near the respective one of the plurality of keywords for each occurrence of the respective one of the plurality of keywords in the document.

20. The method of claim 19 wherein the functions comprise one of warp, snip and mark.

21. A programmed computer, programmed to carry out the method of claim 19.

* * * * *